United States Patent
Iun et al.

(10) Patent No.: US 12,483,860 B2
(45) Date of Patent: Nov. 25, 2025

(54) PHYSICAL DISTANCING TRACKING AND NOTIFICATION

(71) Applicant: Telefonaktiebolaget LM Ericsson (publ), Stockholm (SE)

(72) Inventors: Edwin Iun, Ottawa (CA); Dongsheng Yu, Ottawa (CA); Ping Liu, Nepean (CA); Roland Smith, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 371 days.

(21) Appl. No.: 18/245,418

(22) PCT Filed: Sep. 14, 2021

(86) PCT No.: PCT/IB2021/058382
§ 371 (c)(1),
(2) Date: Mar. 15, 2023

(87) PCT Pub. No.: WO2022/058892
PCT Pub. Date: Mar. 24, 2022

(65) Prior Publication Data
US 2023/0353984 A1    Nov. 2, 2023

Related U.S. Application Data

(60) Provisional application No. 63/079,253, filed on Sep. 16, 2020.

(51) Int. Cl.
*H04W 4/00* (2018.01)
*H04W 4/02* (2018.01)
(Continued)

(52) U.S. Cl.
CPC ........... *H04W 4/029* (2018.02); *H04W 4/021* (2013.01); *H04W 4/023* (2013.01)

(58) Field of Classification Search
CPC ...... H04W 4/029; H04W 4/021; H04W 4/023
See application file for complete search history.

(56) References Cited

U.S. PATENT DOCUMENTS 11,226,392 B1 *   1/2022   Castagnoli ............. G16H 70/60
12,243,061 B1 *   3/2025   Williamson ......... G06Q 30/018
(Continued)

OTHER PUBLICATIONS

International Search Report and Written Opinion dated Feb. 25, 2022 issued in PCT Application No. PCT/IB2021/058382 filed Sep. 14, 2021, consisting of 17 pages.

*Primary Examiner* — Erika A Washington
(74) *Attorney, Agent, or Firm* — Sonoda & Kobayashi Intellectual Property Law; Sarvajit S. Patil

(57) ABSTRACT

A network node and a method for the network node determine a physical distancing metric (PDM) associated with at least one wireless device (WD). The network node includes processing circuitry configured to determine a location of each wireless device (WD) of a plurality of WDs and determine the PDM based at least in part on the location of each WD of a subset of WDs of the plurality of WDs and a predetermined threshold, the location of each of WD of the subset of WDs being within a predefined area. Also, a WD and a method for the WD is provided. The WD includes at least a radio interface configured at least to receive a first message including physical distancing information based at least on the transmitted wireless signal.

19 Claims, 16 Drawing Sheets

(51) Int. Cl.
*H04W 4/021* (2018.01)
*H04W 4/029* (2018.01)

(56) References Cited

U.S. PATENT DOCUMENTS

| | | |
|---|---|---|
| 2017/0046683 A1 | 2/2017 | Shaw et al. |
| 2017/0303187 A1 | 10/2017 | Crouthamel et al. |
| 2019/0164177 A1 | 5/2019 | Yeh et al. |
| 2022/0031161 A1* | 2/2022 | Marathe ............... A61B 5/0008 |

* cited by examiner

PHYSICAL DISTANCING TRACKING AND NOTIFICATION

CROSS-REFERENCE TO RELATED APPLICATIONS

This application is a Submission Under 35 U.S.C. § 371 for U.S. National Stage Patent Application of International Application No.: PCT/IB2021/058382, filed Sep. 14, 2021 entitled "PHYSICAL DISTANCING TRACKING AND NOTIFICATION," which claims priority to U.S. Provisional Application No. 63/079,253, filed Sep. 16, 2020, entitled "PHYSICAL DISTANCING TRACKING AND NOTIFICATION," the entireties of both of which are incorporated herein by reference.

TECHNICAL FIELD

The present disclosure relates to wireless communications, and in particular, to physical distancing tracking and notification using wireless communication technology.

BACKGROUND

Pandemic Physical Distancing Challenge

According to guidelines from Centers for Disease Control and Prevention (https://www.cdc.gov/coronavirus/2019-ncov/prevent-getting-sick/social-distancing.html), COVID-19 spreads mainly among people who are in close contact (within about 6 feet) for a prolonged period. Spread happens when an infected person coughs, sneezes, or talks, and droplets from their mouth or nose are launched into the air and land in the mouths or noses of people nearby. The droplets can also be inhaled into the lungs. Social distancing is especially important for people who are at higher risk for severe illness (e.g., the elderly or immune compromised) from COVID-19.

The CDC (https://www.cdc.gov/coronavirus/2019-ncov/daily-life-coping/personal-social-activities.html) suggests limiting activity indoors, especially group activities, e.g., maintaining as much distance as possible between oneself and other individuals and using cloth face coverings if the other individuals do not interfere with one's activity. If one needs to be indoors, one of the recommendations is to open windows to increase airflow throughout the space.

Due to health and safety concerns, social distancing, also called "physical distancing", is important for controlling COVID-19 spreading. Physical distancing is especially important in a poorly ventilated, indoor, and/or crowded environment. One of the focuses this disclosure is on indoor and small-cell environments. However, this disclosure is not limited to such environments and may well be applicable to other environments, such as an urban environment.

Everybody Carries a Mobile Phone

The popularity of a mobile phone continues to grow with no sign of stopping. In Deloitte's Global mobile consumer trends report of 2018 (https://www2.deloitte.com/content/dam/Deloitte/us/Documents/technology-media-telecommunications/us-global-mobile-consumer-survey-second-edition.pdf) and (https://www2.deloitte.com/global/en/pages/technology-media-and-telecommunications/articles/gx-global-mobile-consumer-trends.html), the mobile phone penetration is over 90%. A 2020 survey shows this trend continues to grow, including a North America penetration rate close to 95%.

Small Cells are Deployed where People are Most Concentrated

A report on $3^{rd}$ Generation Partnership Project (3GPP) 5G (also referred to as "New Radio" (NR)) small cell technology (https://www2.deloitte.com/us/en/pages/technology-media-and-telecommunications/articles/small-cells-big-changes.html), describes small cell as an important technology to achieve advances in capacity and network speed by densification of networks consistent with a 5G strategy over both licensed and unlicensed spectrums—to patch coverage holes, to optimize signal strength, and to increase capacity to meet consumer demand.

The Accenture Strategy Report (https://www.5gcc.ca/wp-content/uploads/2018/06/CWTA-Accenture-Whitepaper-5G-Economic-Impact_Updates_WEB_06-19-2018.pdf) states that 5G will require a greater density of small cells using much smaller equipment, often compared to the size of a shoe box. There is a likelihood that up to 273,000 of these small cells will be deployed across Canada over the next 5 to 7 years in comparison to a network of approximately 33,000 large towers that were deployed over the period of more than 20 years.

The demand for network densification is only going to increase exponentially. Small cell equipment market revenue was around $2 billion in 2014 and was expected to approach $10 billion by 2019.

Indoor Small Cell

Ericsson's indoor small cell is a proven technology for meeting the demand of increased indoor voice and data coverage and capacity (https://www.ericsson.com/en/networks/offerings/urban-wireless/indoor-small-cells?gclid=Cj0KCQjw0rr4BRCtARIsAB0_48MkyyWWYUi5QXmNBNnCsy4UJM Q7-Oc7tA-WjTEXt2c0aIz84eZ6A9saAh0WEALw_wcB&gclsrc=aw.ds). In 5G ecosystems, small cells play an instrumental role in networks to meet high standards-today and into the future. Small cells technology promises delivering of needed coverage and capacity beyond a macro network can be easy, cost-effective, and enable high performance in any indoor environment. In addition, an Indoor Small Cell Solution is compact, energy efficient and lighter in weight than any other product on the market.

As described above, the Indoor Small Cell is designed for network densification. Small places are also places where many users of wireless devices (WDs) typically gather. Unfortunately, large numbers of users in a small indoor space also creates a hot incubation bed for COVID-19 virus spreading. Given that social distancing may decrease COVID-19 virus spreading, social distancing is paramount in situation that arise in small places.

Small Cell 5G NR Beam Forming

Small cell solutions are rapidly moving beyond just providing coverage within buildings or arenas, to becoming enablers of outdoor network densification. All major Communications Service Providers (CSPs) have announced densification plans, with some already deploying small cells into their networks.

Indoor applications are obvious and plentiful. Small cells are ideal for use in places where macro antennas cannot reach with demanded capacity. Small cells also offer a way to rapidly deploy the power of a network with precision and customization for outdoor environments (from sports venues and school campuses to downtown street "canyons" and rural neighborhoods). With a small footprint of hardware, small cells attach discreetly to fixtures such as lampposts, signs, and other street fixtures.

As described above, CSPs are using Small Cell as part of their 5G deployment. 5G technology includes beam forming, a beneficial feature.

Amalgamation of Data Via Sharing of Radio Network Equipment

Existing technology includes device-centric methods for physical distance tracking, i.e., contact tracing to enable WDs to exchange information via Bluetooth beacons regardless of the network to which they are attached. The core of the existing technology is the exchange of random identifiers representing all of Bluetooth proximity contacts within the past 14 days, which would then become available to government healthcare agencies for contact tracing. The existing technology requires users to enable this feature before starting to collect the data and requires additional permissions to share this data, since stored data on the phone constitutes customer ownership.

A network-centric solution collects and maintains all data securely in the core network much in the same way as other private and protected information such as phone calls, durations of calls, and billing information. No software application (App) is required on the phone, nor is permission required to collect this information. However, end customer security of information must be ensured.

While existing technology appears to have solved the multiservice provider problem by transmitting information over unlicensed Bluetooth communications, a network-centric solution may resolve this issue in the context of multi-operator network designs. An example block diagram of different multi-operator networks is shown in FIG. 1.

The 5G Americas and Small Cell Forum published a report on Multi-operator in small cell (https://www.5gamericas.org/wp-content/uploads/2019/07/SCF191_Multi-operator_neutral_host_small_cells.pdf).

This report showed three architectural approaches for multi-operator networks. The common ground among these approaches is the shared network node equipment, e.g., in LTE or NR.

One multi-operator approach is to employ a third party that acts as a 'neutral host' for all the Mobile Network Operators (MNOs). The term 'neutral host' describes a firm that provides services for several operators wishing to deploy infrastructure in a location. In this model, the neutral host collaborates with multiple operators to provide a network solution that is commercially and technically amenable to the operators and acceptable to the venue, e.g., commercial landlord, enterprise or local municipality.

MNOs are facing cost pressure, which makes a multi-operator approach an attractive choice to reduce cost by sharing network equipment. While shared networks are expected to become increasingly common in the deployment of 5G micro and picocells, independent networks also exist. An example of an independent network is shown in FIG. 2.

WD Identification by IMEI, IMSI, RNTI and SPID

Several methods of identity that uniquely differentiate mobile devices, network subscribers, and WDs in an operating cell are available and described as follows.

IMEI

International mobile equipment identity (IMEI) is unique number to identify a mobile phone. Software version (SV) of the device can also be identified along with IMEI by IMEI-SV.

IMSI

International mobile subscriber identity (IMSI) is a unique number to identify a mobile subscriber. IMSI is stored in SIM card and sent to the network for access and authentication.

RNTI

Radio network temporary identifiers (RNTI) are used to differentiate/identify a connected WD in the cell, a specific radio channel, a group of WDs in case of paging, a group of WDs for which power control is issued by the network, system information transmitted for all the WDs by a mobile network.

For 5G NR, WD identifiers can be categorized by their applicable level/purpose:

For scheduling at cell level, Cell RNTI (C-RNTI), Configured Scheduling RNTI (CS-RNTI), Interruption RNTI (INT-RNTI), Paging RNTI (P-RNTI), System Information RNTI (SI-RNTI) and Semi-Persistent CSI RNTI (SP-CSI-RNTI) are used.

For power and slot format control, Slot Format Indication RNTI (SFI-RNTI), Transmit Power Control PUCCH RNTI (TPC-PUCCH-RNTI), Transmit Power Control PUSCH RNTI (TPC-PUSCH-RNTI) and Transmit Power Control SRS RNTI (TPC-SRS-RNTI) are used.

During random access procedure, Random Access RNTI (RA-RNTI) and Temporary C-RNTI (TC-RNTI) are used.

For New Radio (NR) connected to 5GC at NG-RAN level, Inactive RNTI (I-RNTI) is used to identify the WD context in RRC_INACTIVE.

SPID

A Service Profile Identifier (SPID) is a number assigned by a phone company to a terminal on an Integrated Services Digital Network. A SPID tells equipment at the phone company's central office about the capabilities of each terminal (computer or phone).

SPID is used to make Radio Resource Management (RRM) decisions like handover or cell reselection. This decision-making tool does not depend upon power levels, Signal to Noise and Interference Ratio (SINR), Reference Signal Received Power (RSRP), Reference Signal Received Quality (RSRQ), etc. SPID uses grouping method to divide users into various types of cells or frequencies. This grouping scheme is used based on the subscription information received from a system.

Wireless Network Alert and Notification Method

Public Warning System (PWS), e.g., described in 3GPP TS 22.268, includes Earthquake and Tsunami Warning system (ETWS) and Commercial Mobile Alert System (CMAS) for Amber Alert. A common characteristic of this type of system is that it broadcasts to devices in a designated area. Even WDs without SIM card can receive the broadcasts. PWS is push service for a large area (e.g., beyond one cell) or a cell coverage. Device ID or WD ID is not required or collected.

Ericsson's Advanced Subscriber Group Handling takes advantage of device IDs (including IMEI-SV) and subscriber's profiles ID (SPID) to provide customized services for WD groups. This type of feature is pure WD ID-centric and not geography targeted.

Subscriber Agnostic—Network Node, e.g., eNodeB, Initiated Paging

"Cell broadcasting" is a method of relaying short messages to cell phones. Cell broadcasting allows a single text message to be broadcast to all mobile handsets in a given geographical area at the same time. The area can range from a radius covered by a single cell to the entire network. Because cell broadcasting targets cell sites and all phones linked to them at the time, no pre-registration of mobile telephone numbers is required. Cell broadcasting places very little loading on the network, e.g., a cell broadcast to every subscriber on the network is the same as sending an SMS message to a single phone.

Paging is used to inform a WD about changes in system information, emergency notifications, and earthquake or tsunami warning notifications.

A privacy enhancement has been introduced in 5G paging procedures. More specifically, some procedures are used to determine how often temporary identifiers (and ultimately the paging identifiers) are refreshed.

Firstly, I-RNTI is a temporary identifier used by a radio access network. Use of I-RNTI as the paging identifier is a new feature in 5G compared to 4G. By design, I-RNTI is made for one-time use, i.e., refreshing the I-RNTI after every use is compulsory.

Secondly, 5G-S-TMSI is a temporary identifier used by a core network, and 5G enforces a stricter policy for refreshing 5G-S-TMSI.

While in 4G, refreshing the temporary identifier, S-TMSI, after paging is optional, on 5G networks, refreshing 5G-S-TMSI is compulsory. Furthermore, it is also compulsory to allocate new 5G-S-TMSI at initial registration and mobility registration update procedures.

Subscriber Specific—Advanced Subscriber Group Handling

Features such as Advanced Subscriber Group Handling (ASGH) Framework introduce a framework for operators to define advanced subscriber groups which classify subscribers. Using advanced subscriber groups means that different system configurations can be applied. An advanced subscriber group is a subset of all Radio Resource Control (RRC) connected users in a node that fulfills the triggering and selection criteria of a specific advanced subscriber group profile. Further, an advanced subscriber group profile includes triggering parameterization and selection criteria. Triggering parametrization and selection criteria allow classifying the subscribers and the specification of the attributes to differentiate between system configurations.

WDs are selected in a subscriber group with one or more lists. Each trigger list is evaluated independently every time a bearer of a subscriber is set up, modified, or released. Each element within a trigger list is matched irrespective of the other elements of the same list. If a subscriber matches at least one element in a trigger list, the subscriber is considered to match the whole list. An empty list matches all the subscribers. A subscriber is only selected as a member of the advanced subscriber group if the subscriber matches all the lists. An AND logical connection is used to set up a trigger condition. If a subscriber fulfills more than one SubscriberGroupProfile, only the SubscriberGroupProfile with the highest priority applies.

Wd-Centric Solution

Existing solutions have implemented WD-centric tracking and notification methods for COVID-19 and have used Bluetooth beacons as the proximity detection method.

Software applications (Apps) record whether a subscriber has been in close proximity to a recently diagnosed COVID-19 patient. The recorded information is used in contact tracing to be conducted over the infectious period of a person.

Covid-19 by Machine Learning

Ericsson has partnered with the National Institutes of Health, Georgetown university and the White House Office of Science and Technology Policy on their open research dataset challenge COVID-19. This challenge opened several tasks ranging from understanding COVID-19 risk factors to finding treatment protocols.

An outcome of the tasks is a survey on topics such as methods of transmission and incubation, which is extremely valuable for defining Health Care Policy. In addition, a related approach relies on analyzing past events and identifying risk factors. However, the approach does not perform real-time COVID-19 risk detection, nor notification.

SUMMARY

Some embodiments advantageously provide methods and apparatuses for physical distancing tracking and notification. This disclosure takes advantage of the shared equipment. User information in a same coverage area is not required to be side-lobed.

The present disclosure builds on the emerging capabilities of 5G with WD positioning, with increasing mobile user penetration, and the convergence use of shared equipment by multiple operators, i.e., multi-operator environments.

A 5G network node provides coverage with remote radio head (RRH) scheduling or narrow beam scanning, one small area at a time. By calculating the number of users in each small area, the network node detects if there is enough space for safe physical distancing. An SMS message may be automatically generated to instantaneously alert users of WDs of a violation of safe physical distancing. In addition, by combining the exact deployed location of the network node, the directivity of a beam, and an RRH, the network node may use a process, such as one including four "C's," to estimate the viral load that a person may have been exposed to. In addition, the network node may harvest WD location history for contact tracing. Thus, the process described provides a better solution than existing solutions, which are based on WD applications and cannot distinguish whether the user of WD has been at risk of violation safe physical distancing in an indoor or outdoor setting.

In addition, Digital Beam Forming Broadcast and precise location determination using beam and time advance is described. An advanced improvement using WD positioning including the use of triangulation, cell grid geometry and timing advance is also described. Further, this disclosure describes how a cloud implementation may be used to share information across multiple network nodes, e.g., base stations.

In addition, this disclosure describes a network-centric solution which can provide contact tracing data for users of WD, including data to assess duration and proximity of transmissions, e.g., viral transmissions, as well as multiplier factors, such as whether a transmission may have occurred in a crowded and/or a confined location. Tracing data may be used to enable machine learning software to assess and/or notify users of WDs of their risk of infection and/or whether quarantine measures should be taken.

Typical detecting and enforcing of physical distancing has been a labor-intensive manual effort at best. In addition, typical detecting and enforcing of physical distancing is non-real time. By the time persons are informed of an infection risk, it may already be too late, e.g., the virus has already been spread. In other words, typical detecting and enforcing physical distance is a costly and time-consuming effort and takes a substantial human resources. Another downside of detecting and enforcing physical distancing is that law enforcement officers are placed at risk of infection.

There is no existing solution to alert a pedestrian that a space is over-crowded and COVID-19 risk is high. Although there are some device-based solutions, these solutions require users to enable short-range Bluetooth communications and, in many cases, a special application must be installed on a smart phone. These smart phone applications are intrusive and may compromise user privacy. In addition, the existing solutions are not scalable.

Further, contact tracing is labor intensive with a high degree of uncertainty and concerns over privacy. For example, contact tracing traditionally requires interviews with infected persons to recall where they have been and who they may have met within the past several days. Other factors make contact tracing difficult and labor intensive, e.g., incubation periods that can last up to 14 days, and in some cases, up to 40% of asymptomatic people may be infectious for more than 14 days. Therefore, periods of uncertainty as to whether a person is infected can also degrade contact tracing. Although smart phone may use software applications that have been introduced to automate contact tracing, software applications must also be installed and enabled by users. Moreover, these software applications do not have critical information such as whether a user has been in an indoor or outdoor environment.

The World Health Organization has stated that the pandemic may take up to five years to control and "may never go away." Although some vaccines have been developed and are currently in use, variants of the virus have appeared and continue to place an economic burden on society.

A network-centric solution for contact tracing is essential to largely automate this effort, thereby reducing the cost to society in dealing with COVID-19 and future pandemics while maintaining WD privacy. Although this disclosure describes issues arising from situations associated with COVID-19, this disclosure is not limited to such cases and may be applicable to other situations, which may include personnel accountability, determination of exposure to sources other than COVID-19, e.g., other viruses, nuclear sources, chemical sources, etc.

According to an aspect of the present disclosure, a network node supporting communication with at least one wireless device (WD) of a plurality of WDs. The network node is configured to determine a physical distancing metric (PDM) associated with the at least one WD. The network node comprises processing circuitry configured to determine a location of each WD of the plurality of WDs. The method further includes determining the PDM based at least in part on the location of each WD of a subset of WDs of the plurality of WDs and a predetermined threshold. The location of each of WD 22 of the subset of WDs is within a predetermined area.

In some embodiments of this aspect, the predetermined threshold is determined, where the predetermined threshold indicates a threshold of exposure to a predetermined source. The predetermined threshold corresponds to the predetermined area and is determined based on any one of a number of WDs located within the predetermined area; a proximity at least between two WDs of the subset of WDs, where the proximity is determined using one of a time of arrival determination and a distance-radial determination; a time interval in which at least one WD 22 of the subset of WDs has been located within the predetermined area; and the predetermined source. The predetermined source is any one of a virus, a chemical, and nuclear source.

In some other embodiments, the PDM is determined at least by using one of a deployment with beam forming, a deployment with remote radio head, and a deployment with multiple operators.

In an embodiment, an exposure level that a user has been exposed is determined. The user is associated with at least one WD 22. In addition, a WD location history is determined.

In another embodiment, a first message including physical distancing information is transmitted to the at least one WD of the plurality of WDs in part to alert a user of the WD 22 that the PDM one of has been violated and is about to be violated. A second message including exposure level information and WD location history information is transmitted. Any one of the first and second messages are transmitted via a subscriber agnostic broadcast and a subscriber specific message.

In some embodiments, the predetermined area is determined. The predetermined area is any one of a coverage area 18 and a portion of a plurality of portions 19 of the coverage area 18.

In some other embodiments, the predetermined area is updated based on any one of exposure level information associated with the at least one WD; whether the PDM associated with the at least one WD one of has been violated and is about to be violated; and whether the predetermined threshold has been exceeded.

In an embodiment, determining the PDM is performed at least by using a deployment with one of a plurality of network nodes, each one of the plurality of network nodes being in communication with the network node and at least one WD and being used at least to determine the location of each WD based on triangulation; beam forming, a remote radio head; and multiple operators.

In another embodiment, at least one identifier of the at least one WD is collected. A user profile corresponding to the at least one identifier is obtained. The user profile includes user information associated with a user of the at least one WD. The user information includes any one of a vaccination status of the user; a vaccination status associated with a family plan that corresponds to the at least one WD (22); and a behavior of the user. The determining the PDM is further based on the user information included in the user profile.

In some embodiments, the PDM includes an expiration parameter. The expiration parameter indicates a time in which the PDM expires.

In some other embodiments, at least one of the network node and the at least one WD is part of a communication system. The communication system is configurable at least in part to provide and/or act as a location service process including a plurality of levels. A lowest level of the plurality of levels is a radio access network (RAN) configurable to provide communication associated with at least one of a location service request and a location service response to at least one client of the location service process.

According to another aspect, a wireless device, (WD) configured for communication with a network node is described. The WD comprises processing circuitry in communication with a radio interface, and the radio interface is configured to transmit a wireless signal which includes at least identity information associated with the WD to allow determination of the location of the WD receive a first message including physical distancing information based at least on the transmitted wireless signal. The first message is received to alert a user of the WD that a physical distancing metric, PDM, one of has been violated and is about to be violated.

In some embodiments, the PDM is determined based at least in part on the location of the WD and a predetermined threshold. The predetermined threshold indicates a threshold of exposure to a predetermined source. The predetermined threshold corresponds to a predetermined area and is determined based on any one of a number of WDs located within the predetermined area; a proximity at least between two WDs, where the proximity is determined using one of a time of arrival determination and a distance-radial determination; a time interval in which at least one WD 22 has been located within the predetermined area; and the predetermined source. The predetermined source is any one of a virus, a chemical, and nuclear source.

In some other embodiments, the predetermined area is any one of a coverage area and a portion of a plurality of portions of the coverage area.

In an embodiment, a second message including exposure level information and WD location history information is received. Any one of the first and second messages is transmitted via one of a subscriber agnostic broadcast and a subscriber specific message.

In some embodiments, the exposure level information includes an exposure level that a user has been exposed, and the user is associated with the WD.

In some other embodiments, the communication with the network node is performed at least using a deployment with one of a plurality of network nodes, each one of the plurality of network nodes being in communication with the network node and the WD and being used at least to determine the location of the WD based on triangulation; beam forming; a remote radio head; and multiple operators.

In an embodiment, at least one identifier of the WD is transmitted for the network node to obtain a user profile corresponding to the at least one identifier. The user profile includes user information associated with a user of the WD. The user information includes any one of a vaccination status of the user; a vaccination status associated with a family plan that corresponds to the at least one WD; and a behavior of the user. The PDM is further determined based on the user information included in the user profile.

In another embodiment, the at least one identifier includes any one of an International Mobile Equipment Identity, IMEI, a Radio Network Temporary Identifiers, RNTI, an International Mobile Subscriber Identity, IMSI, and a Service Profile Identifier, SPID.

In some embodiments, the PDM includes an expiration parameter. The expiration parameter indicates a time in which the PDM expires.

In some other embodiments, another signal is transmitted, including an indication indicating one of opting out of receiving the physical distancing information and opting in to receive the physical distancing information.

In an embodiment, at least one of the WD and the at least network node is part of a communication system. The communication system is configurable at least in part to provide and/or act as a location service process including a plurality of levels. A lowest level of the plurality of levels is a radio access network (RAN) configurable to provide communication associated with at least one of a location service request and a location service response to at least one client of the location service process

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
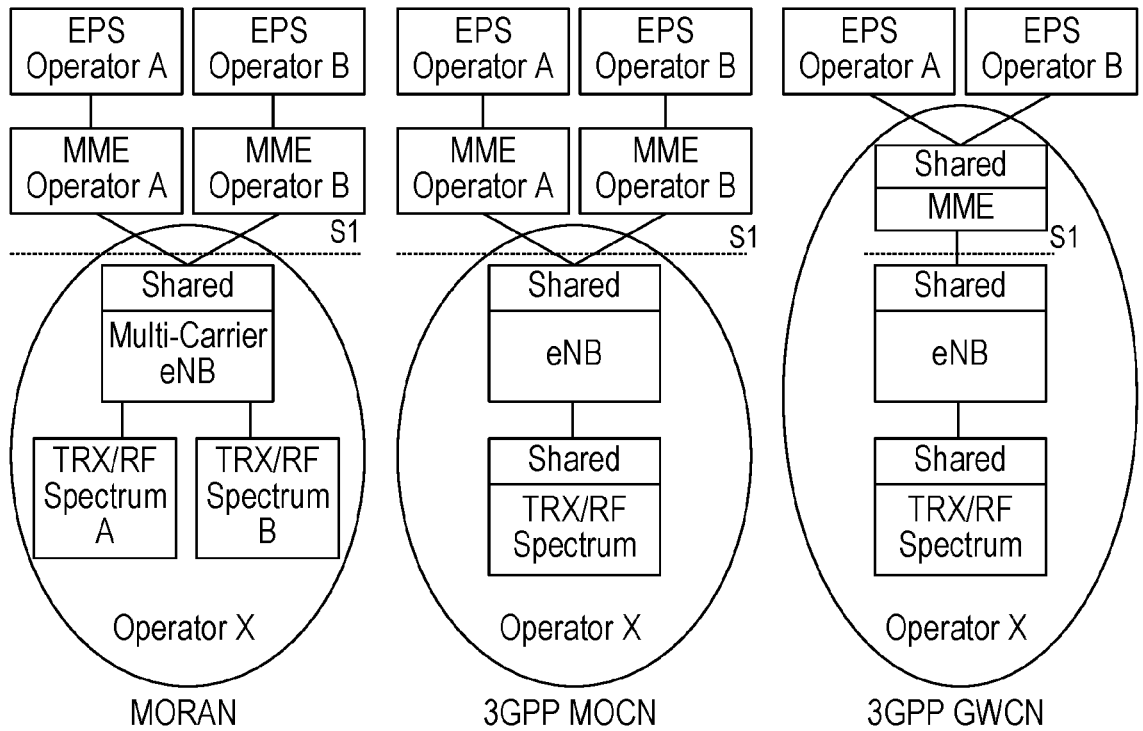
FIG. 1 is a block diagram of example multiple-operator networks.
Figure 2:
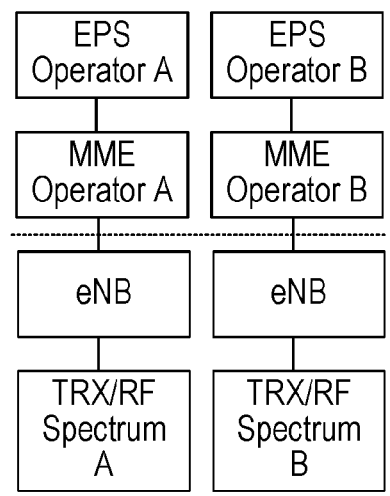
FIG. 2 is a bock diagram of example independent networks.

Some embodiments of the present disclosure allow for using emerging capabilities of 5G with WD positioning and the convergence use of shared equipment by multiple operators.

A 5G network node provides coverage with a remote radio head (RRH) scheduling or narrow beam scanning, one small area at a time. In some embodiments, by calculating the number of users in each small area, the network node detects if there is enough space for safe physical distancing.

A message, such as short message service (SMS) message, may be automatically generated to alert at risk users instantaneously. In addition, by combining the exact deployed location of the network node, a directivity of at least a beam, and a remote radio head (RRH), the network node may use a process, such as the four "C's," to estimate a viral load that a person may have been exposed to. The network node may also harvest a WD location history for contact tracing.

In other embodiments, the network node takes advantage of Digital Beam Forming Broadcast and precise location using beam and time advance. WD positioning may include the use of triangulation, cell grid geometry and timing advance. In some embodiments, cloud implementation may be used to share information across multiple network nodes and/or networks.

In addition, this disclosure describes a network-centric solution, e.g., an application on the WD is not required for the network node to determine a WD location. The network-centric solution may provide contact tracing data for users of WDs including data to assess duration and proximity of transmissions, as well as multiplier factors such as whether transmission occurred in a crowded and/or confined location. This data can be used to enable machine learning software to assess and notify/alert users of their risk of infection and whether quarantine measures should be taken. For example, a subscriber may be notified at least to inform that the subscriber is in high risk of COVID-19 exposure and should take immediate action. The alerting is completed in real-time before the subscriber may catch a COVID-19 infection.

In other embodiments, WD tracking data and technology may be used, such as data available with the introduction of 5G technology and current commercial trends of sharing radio network equipment. The following are some advantages of the methods and apparatuses described in the present disclosure:

Non-Intrusive Real-Time Network Process while Respecting Subscriber Privacy

A network-centric process provides advantages over WD-centric processes. WD-centric processes are intrusive and may use WD tracking data intended for WD hand-over. The network node, in a network-centric process, performs real-time measurements that are transparent to the user of the WD without service interruption, thereby providing additional advantages over WD-based solutions, such as Bluetooth and smart phone applications. In addition, an alert service may be provided including broadcasting anonymously or via subscriber "opt-in."

New Value Vertical without Additional Hardware Cost

The processes described in this disclosure may be implemented without requiring additional equipment. No additional 3GPP standards changes are needed, i.e., the features and processes of this disclosure are fully compliant with 3GPP standards.

In cases of independent networks, all of the same WD grid or positional data and processing methodologies may be used, by making time stamped logs available across different network cores by tagging the logs with a unique key derived from the IMEI or other identifiers. For example, a public key derived from the WD IMEI would guarantee end customer anonymity, which allows open distribution without compromising security, while empowering third party applications with essential data to initiate notifications, perform contact tracing, or use machine learning algorithms to assess customer risk of infection.

Processed results could be sent back to an appropriate independent network using the public key, for client notification and/or dissemination to healthcare agencies responsible for contact tracing. In addition, two RNTIs may be used, e.g., in combination, to tally the number of users under a coverage area.

C-RNTI (Cell-RNTI)

C-RNTI is a unique identification used for identifying RRC Connection and scheduling. C-RNTI is dedicated to a particular WD. A network node uses C-RNTI to allocate a WD with uplink grants, downlink assignments, PDCCH order etc. C-RNTI is also used by the network node to differentiate uplink transmissions (e.g., PUSCH, PUCCH) of a WD from others. The network node assigns different C-RNTI values to different WDs in a cell. When Carrier Aggregation is configured, the same C-RNTI applies to all serving cells. In MR-DC, two C-RNTIs are independently allocated to the WD: one for Master Cell Group (MCG), and one for Secondary Cell Group (SCG). After successful completion of contention-based RA procedure, the WD promotes Temporary C-RNTI to C-RNTI (if the WD doesn't have a C-RNTI already). During handover within NR or from other RAT to NR, C-RNTI (as a new WD-Identity in the target cell) is explicitly provided by the network in the reconfiguration message.

I-RNTI (Inactive-RNTI)

I-RNTI is used to identify the suspended WD context of a WD in RRC_Inactive state. The network node assigns I-RNTI to the WD when moving from RRC_CONNECTED to RRC_Inactive in RRC Release message within SuspendConfig. Two types of I-RNTIs namely full I-RNTI and shortI-RNTI are defined. The network informs the WD in SIB1 which I-RNTI to be used while resuming the connection (in the RRCResumeRequest message). If the field useFullResumeID is present in SIB1, the WD shall use full-RNTI, otherwise, the WD shall use shortI-RNTI. While resuming the connection, if fullI-RNTI is used, the WD sends RRCResumeRequest1 message, else if shortI-RNTI is used, the WD sends RRCResumeRequest message. The I-RNTI is also used for paging purposes for WDs in RRC_Inactive state. The network node uses only fullI-RNTI as part of PagingUE-Identity within the Paging message. The fullI-RNTI is a bit string having a length of forty bits while the shortI-RNTI is a bit string having a length of twenty-four bits.

Before describing in detail exemplary embodiments, it is noted that the embodiments reside primarily in combinations of apparatus components and processing steps related to physical distancing tracking and notification. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), baseband unit (BBU), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), a Mobile Management Entity (MME), an Access and Mobility Function (AMF) node, a Service Media/Management Function (SMF) node, an Authentication Server Function (ASF) node, a Unified Data Management (UDM) node, a Network Resource Function (NRF) node, a User Plane Functionality (UPF) node, a Serving Mobile Location Center (SMLC), a Gateway Mobile Location Centre (GMLC), a Distributed Unit (DU), a Central Unit (CU), a Radio Unit (RU), any Open Radio Access Network (O-RAN) components such as an O-RAN Radio Unit (O-RU), an O-RAN Distributed Unit (O-DU), and an O-RAN Central Unit (O-CU), etc. The network node may also comprise test equipment. The term "radio node" used herein may be used to also denote a wireless device (WD) such as a wireless device (WD) or a radio network node.

Further, a network node may communicate via a plurality of layers, e.g., layers and/or sublayers such as Packet Data Control Protocol (PDCP), Radio Link Control (RLC), Medium Access Control (MAC), Physical Layer High (PHY-H), Physical Layer Low (PHY-L), and/or Radio Frequency (RF). In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

In some embodiments, the term "WD" may be a vehicle with integrated wireless device functionality/hardware, a vehicle engaged in V2X communication/services, a wireless device inside a vehicle, the wireless device of a VRU, a wireless device supporting communication via D2D, a WD and the like.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH). In addition, the generic term "radio network node" may refer to a "network node."

In some embodiments, the term "radio resource" is intended to indicate a frequency resource and/or a time resource. The time resource may correspond to any type of physical resource or radio resource expressed in terms of length of time. Examples of time resources are: symbol, time slot, subframe, radio frame, transmission time interval (TTI), interleaving time, etc. The frequency resource may correspond to one or more resource elements, subcarriers, resource blocks, bandwidth part and/or any other resources in the frequency domain. The radio resource may also indicate a combination of subcarriers, time slots, codes and/or spatial dimensions.

Even though the descriptions herein may be explained in the context of one of a Downlink (DL) and an Uplink (UL) communication, it should be understood that the basic principles disclosed may also be applicable to the other of the one of the DL and the UL communication. For DL communication, the network node is the transmitter and the receiver is the WD. For the UL communication, the transmitter is the WD and the receiver is the network node.

In some embodiments, the allocated radio resource may be allocated for a particular signal and on a particular channel. Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

A channel may generally be a logical, transport or physical channel. A channel may comprise and/or be arranged on one or more carriers, in particular a plurality of subcarriers. A channel carrying and/or for carrying control signaling/ control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction. Examples of channels comprise a channel for low latency and/or high reliability transmission, in particular a channel for Ultra-Reliable Low Latency Communication (URLLC), which may be for control and/or data. In some embodiments, the channel described herein may be an uplink channel and in further embodiments may be a physical uplink shared channel (PUSCH) or a physical uplink control channel (PUCCH). In some embodiments, the channel may be a downlink channel, such as, a physical downlink control channel (PDCCH) or a physical downlink shared channel (PDSCH).

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
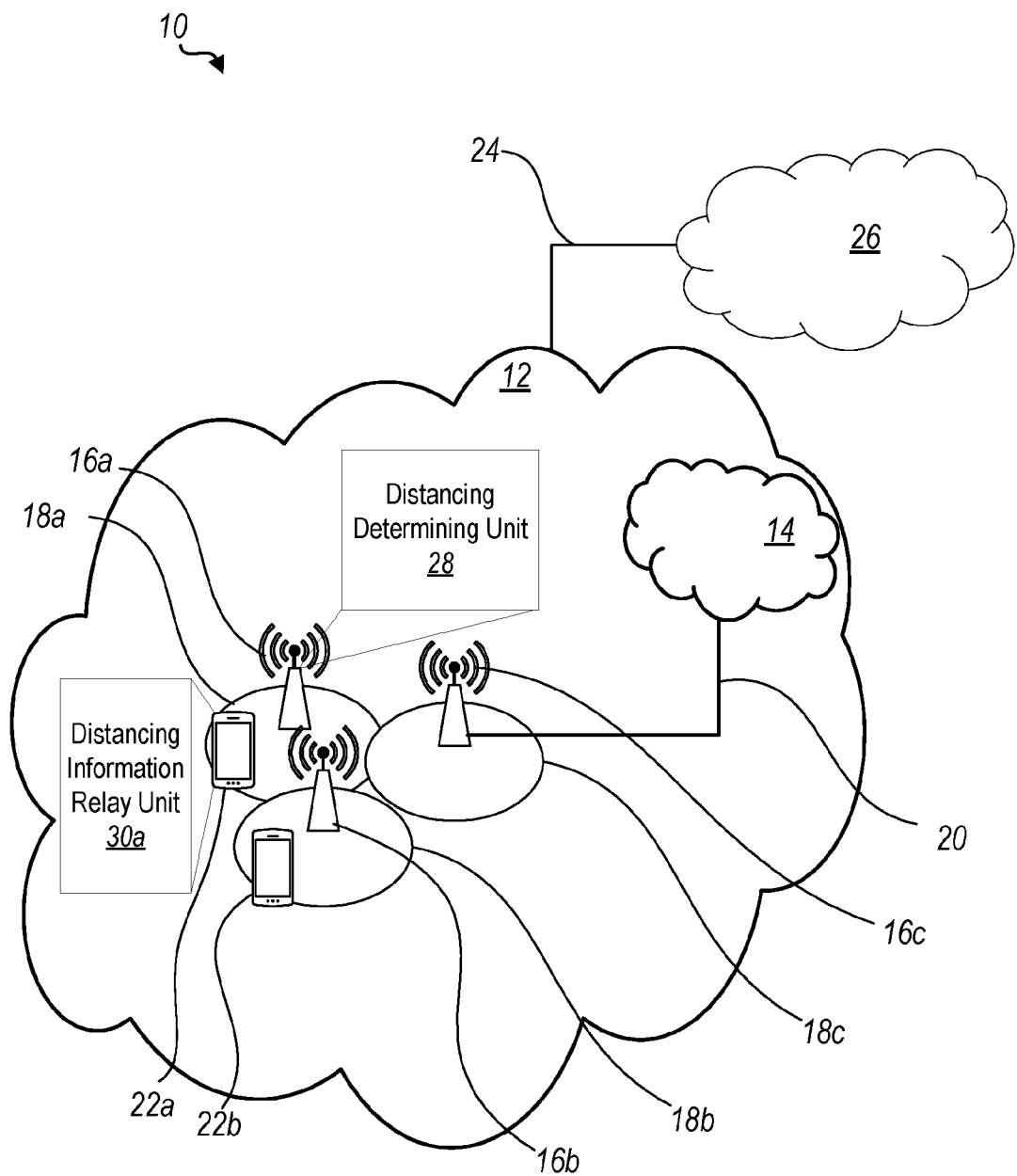
FIG. 3 is a schematic diagram of an example network architecture illustrating a communication system according to the principles in the present disclosure.

Some embodiments provide arrangements for physical distancing determination. Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. Communication system 10 may be configurable at least in part to provide and/or act as a location service process, e.g., a location service function, including a plurality of levels. A lowest level of the plurality of levels may be a radio access network (RAN), e.g., access network 12, which may be configurable to provide communication associated with at least one of a location service request and a location service response, e.g., to at least one client of the location service process, where a client may include a health care authority, government official(s) and/or border security official(s).

The access network 12 comprises a plurality of network nodes 16a, 16b, 16c (referred to collectively as network nodes 16), such as NBs, eNBs, gNBs or other types of wireless access points, each defining/serving a corresponding coverage area 18a, 18b, 18c (referred to collectively as coverage areas 18). Coverage area 18 may refer to a communication cell, e.g., physical/logical cell, and may include a plurality of portions of the coverage area. Further, access network 12 may include without limitation any type of access network such as RAN, O-RAN, any cloud communication network and be connected to another could communication network, such as cloud communication network 26, e.g., via connection 24. Cloud communication network 26 may include any one of the components of access network 12. Core network 14 may also include a plurality of network nodes 16, e.g., any one of the following network nodes: AMF, SMF, AUSF, UDM, NRF, UPF, or any other type of network node. Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD 22 is in the coverage area or where a sole WD 22 is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include a distancing determining unit 28 which is configured to cause the network node 16 to determine a physical distancing metric (PDM) based at least on a location of each WD of a subset of WDs of a plurality of WDs, the location of each of WD of the subset of WDs being within a predefined area. Distancing determining unit 28 may also perform any other processes described in this disclosure. As used herein, PDM may refer to at least one metric associated with a distance from a predetermined source, e.g., a virus, a chemical source, a nuclear source, a living organism such as a person/animal, and/or non-living organism/thing. Further, PDM may refer to and/or include a physical contacts metric (PCM) and/or a physical contacts tracking metric (PCTM). Either one of PCM and PCTM may refer to one metric associated with physical contact with the predetermined source, e.g., a virus, a chemical source, a nuclear source, a living organism such as a person/animal, and/or non-living organism/thing. Physical contact may refer to direct and/or indirect contact with the predetermined source.

WD 22a is configured to include a distancing information relay unit 30a which is configured to receive optional physical distancing information based at least on a wireless signal transmitted by WD 22a and location information associated with WDs in proximity with the WD. The optional physical distancing information may include a physical distancing notification and/or a physical distancing metric (PDM) and/or information alerting that a PDM has exceeded a predefined threshold. Distancing information relay unit 30a may also perform any other processes described in this disclosure.

Any WD 22, e.g., WD 22b, may include a distancing information relay unit 30 configured to perform similar functions as the functions of the distancing information relay unit 30a included in WD 22a.

Example implementations, in accordance with an embodiment, of the WD 22a, the WD 22b, and network node 16 discussed in the preceding paragraphs will now be described with reference to FIG. 4.

The communication system 10 further includes a network node 16 provided in a communication system 10 and including hardware 32 enabling it to communicate with the WD 22. The hardware 32 may include a communication interface 34 for setting up and maintaining a wired or wireless connection with an interface of a different communication device of the communication system 10, as well as a radio interface 36 for setting up and maintaining at least a wireless connection 38 with the WD 22a located in a coverage area 18 served by the network node 16. Wireless communication connection may comprise one or more communication links, e.g., 5G beams, RRH connections to a WD. The radio interface 36 may be formed as or may include, for example, one or more RF transmitters, one or more RF receivers, and/or one or more RF transceivers, as well as one or more antennas 37. Antenna 37 may refer to an RRH and/or may produce one or more beams.

In the embodiment shown, the hardware 32 of the network node 16 further includes processing circuitry 42. The processing circuitry 42 may include a processor 44 and a memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) the memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 48 stored internally in, for example, memory 46, or stored in external memory (e.g., database, storage array, network storage device, etc.) accessible by the network node 16 via an external connection. The software 48 may be executable by the processing circuitry 42. The processing circuitry 42 may be configured to control any of the methods and/or processes described herein and/or to cause such methods, and/or processes to be performed, e.g., by network node 16. Processor 44 corresponds to one or more processors 44 for performing network node 16 functions described herein. The memory 46 is configured to store data, programmatic software code and/or other information described herein. In some embodiments, the software 48 may include instructions that, when executed by the processor 44 and/or processing circuitry 42, causes the processor 44 and/or processing circuitry 42 to perform the processes described herein with respect to network node 16. For example, processing circuitry 42 of the network node 16 may include distancing determining unit 28 configured to perform network node methods discussed herein, such as the methods discussed with reference to FIGS. 5 and 6 as well as other figures.

Network node 16 may also include one or more additional elements (shown in FIGS. 11 and 19) as part of hardware 32 (and/or software 48), and/or as part of and/or in communication with any one of the elements of hardware 32 (and/or software 48) already described such as processing circuitry 42 and/or radio interface 36 and/or distancing determining unit 28. The one or more additional elements may include any one or more of a subscriber database 68, an alert generator 70, a grid definition and threshold definition 72, a subscriber discovery 74, a grid RF signal coverage management 76, a beam forming engine 78, a signal switcher 80, a subscriber list 84, an opt-out list 86, a monitoring engine 88, and/or a WD tracker 90. Any one of the additional elements may be configured to perform the blocks and/or functions and/or methods and/or processes described in the present disclosure.

The communication system 10 further includes the WD 22a already referred to. The WD 22a may have hardware 50 that may include a radio interface 52 configured to set up and maintain a wireless connection 38 with a network node 16, e.g., via antenna 37, serving a coverage area 18 in which the WD 22a is currently located. The radio interface 52 may be formed as or may include, for example, one or more RF transmitters, one or more RF receivers, and/or one or more RF transceivers. In some embodiments, the radio interface 52 may be a cellular interface (Uu) and may be configured to support Uu communication. The hardware 50 may also include a communication interface 54 configured to set up and maintain a wireless connection 56 with other WDs 22, such as WD 22b. In some embodiments, the communication interface 54 is further configured to support PC5 Mode 1 communication and PC5 Mode 2 communication. As such, the communication interface 54 may include a PC5 Mode 1 interface and/or a PC5 Mode 2 interface. The communication interface 54 may be formed as or may include, for example, one or more RF transmitters, one or more RF receivers, and/or one or more RF transceivers and may use the same RF components as the radio interface 52. The radio interface 52 and the communication interface 54 may, both or individually, form a communication interface of WD 22a. In other words, "communication interface" as used herein refers to one or the other or both of the radio interface 52 and the communication interface 54.

The hardware 50 of the WD 22a further includes processing circuitry 58. The processing circuitry 58 may include a processor 60 and memory 62. In particular, in addition to or instead of a processor, such as a central processing unit, and memory, the processing circuitry 58 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 60 may be configured to access (e.g., write to and/or read from) memory 62, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22a may further comprise software 64, which is stored in, for example, memory 62 at the WD 22a, or stored in external memory (e.g., database, storage array, network storage device, etc.) accessible by the WD 22a. The software 64 may be executable by the processing circuitry 58. The software 64 may include a client application 66. The client application 66 may be operable to provide a service to a human or non-human user via the WD 22a. The client application 66 may interact with the user to generate the user data that it provides.

The processing circuitry 58 may be configured to control any of the methods and/or processes described herein and/or to cause such methods, and/or processes to be performed, e.g., by WD 22a. The processor 60 corresponds to one or more processors 60 for performing WD 22a functions described herein. The WD 22a includes memory 62 that is configured to store data, programmatic software code and/or other information described herein. In some embodiments, the software 64 and/or the client application 66 may include instructions that, when executed by the processor 60 and/or processing circuitry 58, causes the processor 60 and/or processing circuitry 58 to perform the processes described herein with respect to WD 22a. For example, the processing circuitry 58 of the WD 22a may be configured to use resources and/or receive and/or transmit on radio resources (e.g., physical layer resources, such as, physical downlink control channel, physical downlink shared channel, physical uplink control channel and/or physical uplink shared channel, etc.) that are allocated to the WD 22a using one or more of the techniques disclosed herein.

Figure 4:
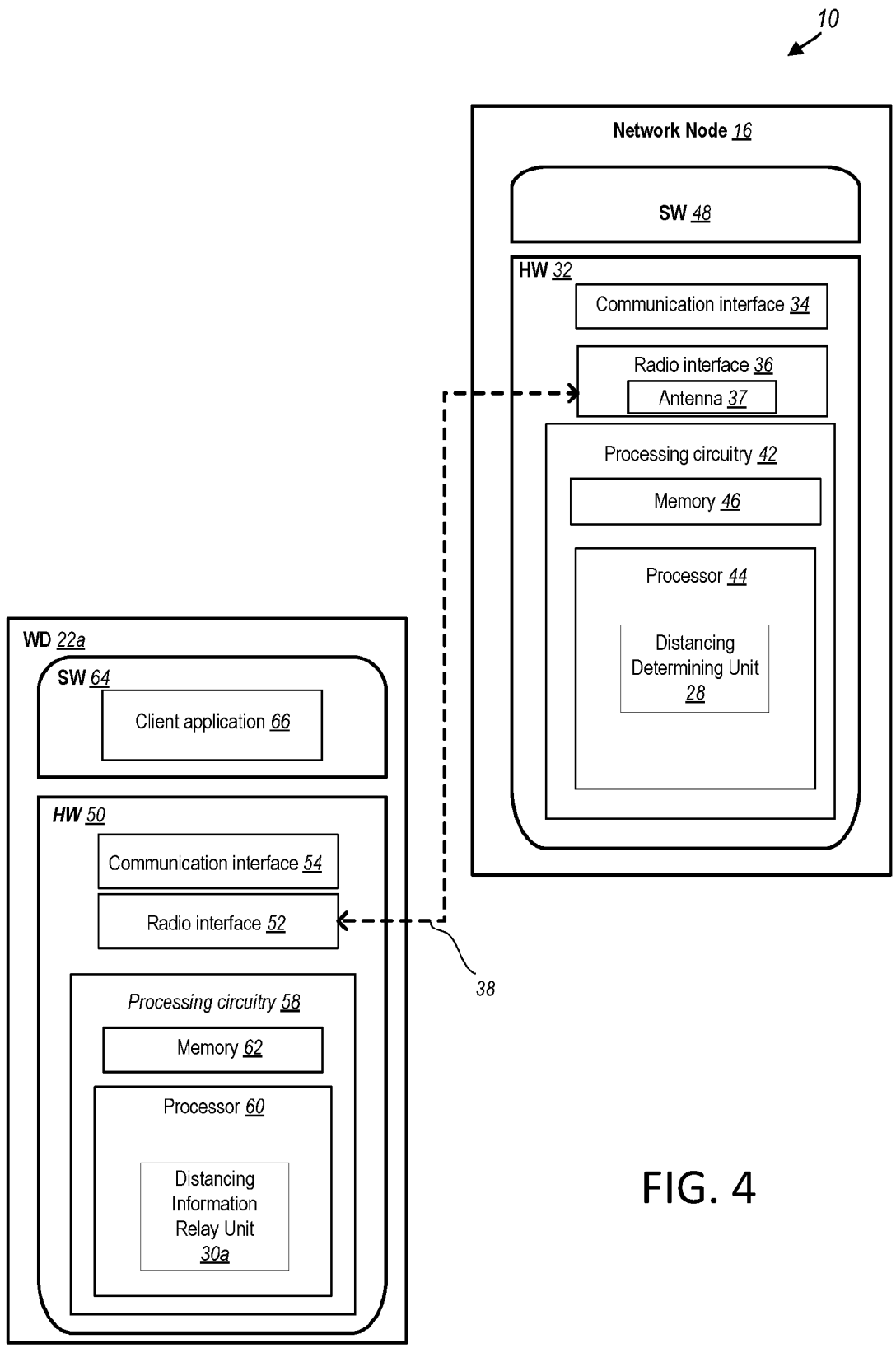
FIG. 4 is a block diagram of a network node supporting communication with wireless devices over an at least partially wireless connection and wireless devices supporting communication with the network node according to some embodiments of the present disclosure.

In some embodiments, the inner workings of the network node 16, WD 22a and WD 22b, may be as shown in FIG. 4 and independently, the surrounding network topology may be that of FIG. 3.

Although FIGS. 3 and 4 show various "units" such as distancing determining unit 28 and distancing information relay unit 30a as being within a processor, it is contemplated that these units may be implemented such that a portion of the unit is stored in a corresponding memory within the processing circuitry. In other words, the units may be implemented in hardware or in a combination of hardware and software within the processing circuitry.

Figure 5:
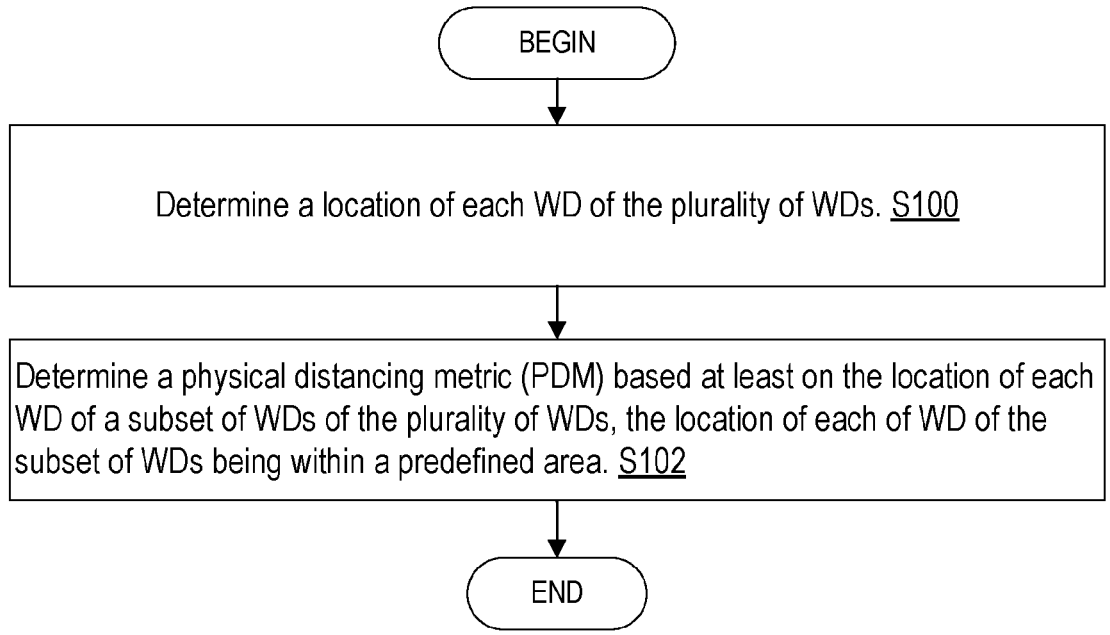
FIG. 5 is a flowchart of an example method for a network node for determining a physical distancing metric (PDM) according to one embodiment of the present disclosure.

FIG. 5 is a flowchart of an example process in a network node 16 for determining a physical distancing metric (PDM). One or more Blocks and/or functions and/or methods performed by network node 16 may be performed by one or more elements of network node 16 such as by distancing determining unit 28 in processing circuitry 42, processor 44, communication interface 34, radio interface 36, etc. The example method includes determining (Block S100), such as via distancing determining unit 28, processing circuitry 42, processor 44, communication interface 34 and/or radio interface 36, a location of each WD of the plurality of WDs. The method further includes determining (Block S110), such as via distancing determining unit 28, processing circuitry 42, processor 44, communication interface 34 and/or radio interface 36, a physical distancing metric (PDM) based at least on the location of each WD of a subset of WDs of the plurality of WDs, the location of each of WD of the subset of WDs being within a predefined area.

In some embodiments of this aspect, the method further includes determining, such as via distancing determining unit 28, processing circuitry 42, processor 44, communication interface 34 and/or radio interface 36, that the PDM in the area exceeds a predetermined threshold and transmitting, such as via distancing determining unit 28, processing circuitry 42, processor 44, communication interface 34 and/or radio interface 36, a message to at least a WD of the plurality of WDs to alert a user of the WD that the PDM has exceeded the predetermined threshold. In other embodiments, a viral load that a person has been exposed to is estimated, such as via distancing determining unit 28, processing circuitry 42, processor 44, communication interface 34 and/or radio interface 36, where the person is associated with at least one WD of the plurality of WDs. A WD location history is determined, such as via distancing determining unit 28, processing circuitry 42, processor 44, communication interface 34 and/or radio interface 36, for contact tracing.

In some other embodiments, determining the PDM is at least by using one of a deployment with beam forming, a deployment with remote radio head, and a deployment with multiple operators.

Figure 6:
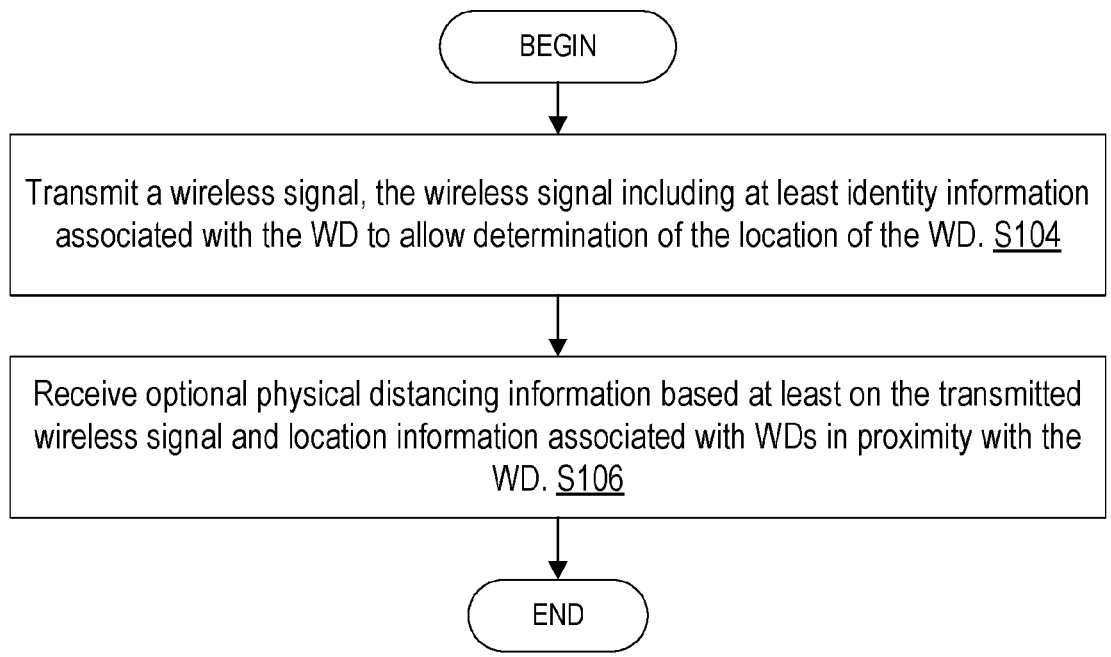
FIG. 6 is a flowchart of another example method for a wireless device for receiving a physical distancing notification according to one embodiment of the present disclosure.

FIG. 6 is of an example method for a wireless device for receiving a physical distancing notification. One or more Blocks and/or functions and/or methods performed by the WD 22 may be performed by one or more elements of WD 22, such as distancing information relay unit 30a in processing circuitry 58, processor 60, communication interface 54, radio interface 52, etc. according to the example method. The distancing information relay unit 30a may be an optional feature. The example method includes transmitting a wireless signal (Block S104), such as via distancing information relay unit 30a, processing circuitry 58, processor 60, communication interface 54 and/or radio interface 52, the wireless signal including at least identity information associated with the WD to allow determination of the location of the WD. The method further includes receiving (Block S106), such as via distancing information relay unit 30a, processing circuitry 58, processor 60, communication interface 54 and/or radio interface 52, optional physical distancing information based at least on the transmitted wireless signal and location information associated with WDs in proximity with the WD.

In some embodiments of this aspect, the optional physical distancing information includes a physical distancing metric (PDM). The physical distancing information alerts, such as via distancing information relay unit 30a, processing circuitry 58, processor 60, communication interface 54 and/or radio interface 52, a user of the WD that the PDM has exceeded a predetermined threshold. In some other embodiments, an estimate viral load that a person has been exposed to is received, such as via distancing information relay unit 30a, processing circuitry 58, processor 60, communication interface 54 and/or radio interface 52, the person is associated with the WD. In addition, the method includes receiving, such as via distancing information relay unit 30a, processing circuitry 58, processor 60, communication interface 54 and/or radio interface 52, a WD location history for contact tracing. In some embodiments, the method further includes receiving the optional physical distancing information at least via one of a subscriber agnostic broadcast and a subscriber specific message.

Figure 7:
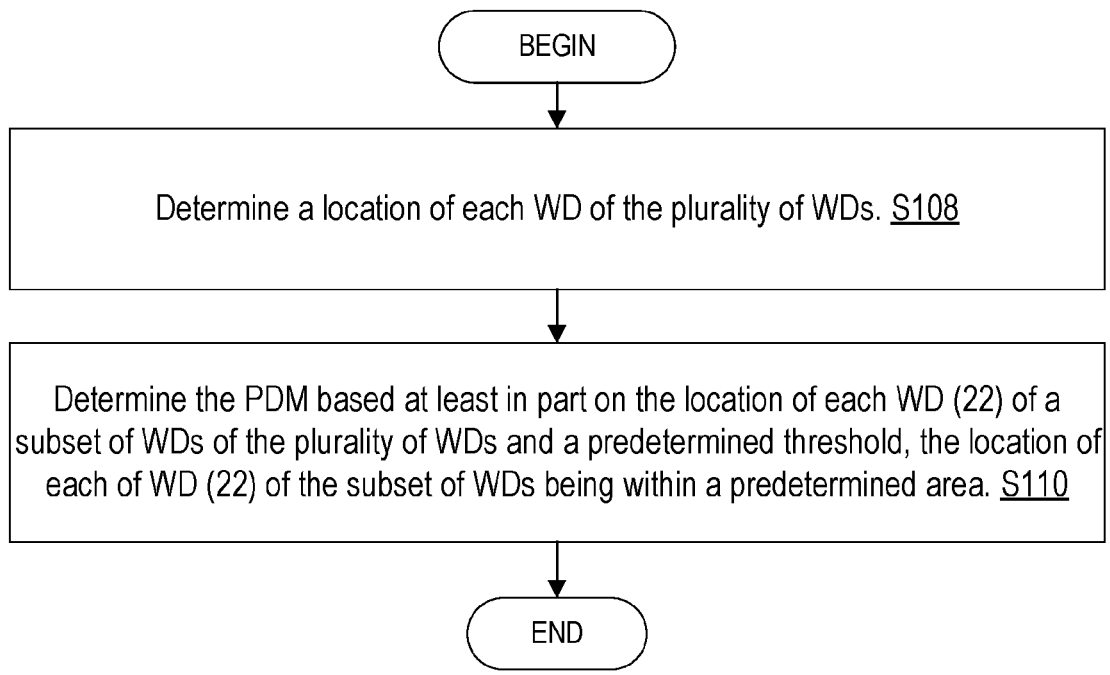
FIG. 7 is a flowchart of another example method for a network node for determining a physical distancing metric (PDM) according to one embodiment of the present disclosure.

FIG. 7 is a flowchart of another example process in a network node 16 for determining a physical distancing metric (PDM). One or more Blocks and/or functions and/or methods performed by network node 16 may be performed by one or more elements of network node 16 such as by distancing determining unit 28 in processing circuitry 42, processor 44, communication interface 34, radio interface 36, etc. The example method includes determining (Block S108), such as via distancing determining unit 28, processing circuitry 42, processor 44, communication interface 34 and/or radio interface 36, a location of each WD of the plurality of WDs. The method further includes determining (Block S110), such as via distancing determining unit 28, processing circuitry 42, processor 44, communication interface 34 and/or radio interface 36, the PDM based at least in part on the location of each WD 22 of a subset of WDs of the plurality of WDs and a predetermined threshold, the location of each of WD 22 of the subset of WDs being within a predetermined area.

In some embodiments of this aspect, the predetermined threshold is determined, such as via processing circuitry 42, where the predetermined threshold indicates a threshold of exposure to a predetermined source. The predetermined threshold corresponds to the predetermined area and is determined based on any one of a number of WDs 22 located within the predetermined area; a proximity at least between two WDs 22 of the subset of WDs, where the proximity is determined using one of a time of arrival determination and a distance-radial determination; a time interval in which at least one WD 22 of the subset of WDs has been located within the predetermined area; and the predetermined source. The predetermined source is any one of a virus, a chemical, and nuclear source.

In some other embodiments, the PDM is determined, such as via, such as via processing circuitry 42, at least by using one of a deployment with beam forming, a deployment with remote radio head, and a deployment with multiple operators.

In an embodiment, an exposure level that a user has been exposed is determined, such as via processing circuitry 42, the user being associated with at least one WD 22, a WD location history is determined, such as via processing circuitry 42, for exposure tracing.

In another embodiment, a first message including physical distancing information is transmitted, such as via radio interface 36, to the at least one WD 22 of the plurality of WDs in part to alert a user of the WD 22 that the PDM one of has been violated and is about to be violated. A second message including exposure level information and WD location history information is transmitted, such as via radio interface 36. Any one of the first and second messages are transmitted via a subscriber agnostic broadcast and a subscriber specific message.

In some embodiments, the predetermined area is determined, such as via processing circuitry 42 and/or radio interface 36. The predetermined area is any one of a coverage area 18 and a portion of a plurality of portions 19 of the coverage area 18.

In some other embodiments, the predetermined area is updated, such as via processing circuitry 42 and/or radio interface 36, based on any one of exposure level information associated with the at least one WD 22; whether the PDM associated with the at least one WD 22 one of has been violated and is about to be violated; and whether the predetermined threshold has been exceeded.

In an embodiment, determining the PDM is performed at least by using a plurality of network nodes, each one of the plurality of network nodes being in communication with the network node 16 and at least one WD 22 and being used at least to determine the location of each WD based on triangulation; a deployment with one of beam forming; a remote radio head; and multiple operators.

In another embodiment, at least one identifier of the at least one WD 22 is collected, such as via processing circuitry 42 and/or radio interface 36. A user profile corresponding to the at least one identifier is obtained, such as via processing circuitry 42 and/or radio interface 36. The user profile includes user information associated with a user of the at least one WD 22. The user information includes any one of a vaccination status of the user; a vaccination status associated with a family plan that corresponds to the at least one WD 22; and a behavior of the user. The determining the PDM is further based on the user information included in the user profile.

In some embodiments, the PDM includes an expiration parameter. The expiration parameter indicates a time in which the PDM expires.

In some other embodiments, at least one of the network node 16 and the at least one WD 22 is part of a communication system 10. The communication system 10 is configurable at least in part to provide and/or act as a location service process including a plurality of levels. A lowest level of the plurality of levels is a radio access network (RAN) configurable to provide communication associated with at least one of a location service request and a location service response to at least one client of the location service process.

Figure 8:
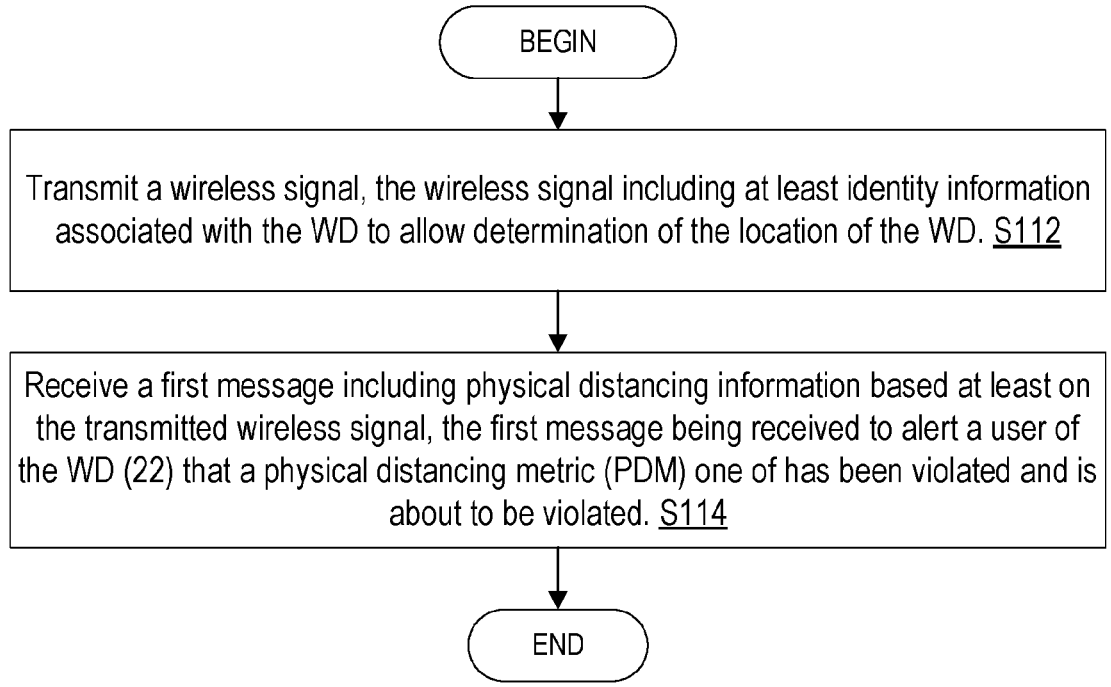
FIG. 8 is a flowchart of another example method for a wireless device for receiving a physical distancing notification according to one embodiment of the present disclosure.

FIG. 8 is of another example method for a wireless device 22 for receiving a physical distancing notification. One or more Blocks and/or functions and/or methods performed by the WD 22 may be performed by one or more elements of WD 22, such as distancing information relay unit 30a in processing circuitry 58, processor 60, communication interface 54, radio interface 52, etc. according to the example method. The distancing information relay unit 30a may be an optional feature. The example method includes transmitting a wireless signal (Block S112), such as via distancing information relay unit 30a, processing circuitry 58, processor 60, communication interface 54 and/or radio interface 52, the wireless signal including at least identity information associated with the WD 22 to allow determination of the location of the WD 22. The method further includes receiving (Block S114), such as via distancing information relay unit 30a, processing circuitry 58, processor 60, communication interface 54 and/or radio interface 52, a first message including physical distancing information based at least on the transmitted wireless signal. The first message is received to alert a user of the WD 22 that a physical distancing metric (PDM) one of has been violated and is about to be violated.

In some embodiments, the PDM is determined based at least in part on the location of the WD 22 and a predetermined threshold. The predetermined threshold indicates a threshold of exposure to a predetermined source. The predetermined threshold corresponds to a predetermined area and is determined based on any one of a number of WDs 22 located within the predetermined area; a proximity at least between two WDs 22, where the proximity is determined using one of a time of arrival determination and a distance-radial determination; a time interval in which at least one WD 22 has been located within the predetermined area; and the predetermined source. The predetermined source is any one of a virus, a chemical, and nuclear source.

In some other embodiments, the predetermined area is any one of a coverage area 18 and a portion of a plurality of portions 19 of the coverage area 18.

In an embodiment, a second message including exposure level information and WD location history information is received, such as via radio interface 52. Any one of the first and second messages is transmitted via one of a subscriber agnostic broadcast and a subscriber specific message.

In some embodiments, the exposure level information includes an exposure level that a user has been exposed, and the user is associated with the WD 22.

In some other embodiments, the communication with the network node 16 is performed at least using a plurality of network nodes, each one of the plurality of network nodes being in communication with the network node 16 and the WD 22 and being used at least to determine the location of the WD 22 based on triangulation; a deployment with one of beam forming; a remote radio head; and multiple operators.

In an embodiment, at least one identifier of the WD 22 is transmitted, such as via radio interface 52, for the network node 16 to obtain a user profile corresponding to the at least one identifier. The user profile includes user information associated with a user of the WD 22. The user information includes any one of a vaccination status of the user; a vaccination status associated with a family plan that corresponds to the at least one WD 22; and a behavior of the user. The PDM is further determined based on the user information included in the user profile.

In another embodiment, the at least one identifier includes any one of an International Mobile Equipment Identity, IMEI, a Radio Network Temporary Identifiers, RNTI, an International Mobile Subscriber Identity, IMSI, and a Service Profile Identifier, SPID.

In some embodiments, the PDM includes an expiration parameter. The expiration parameter indicates a time in which the PDM expires.

In some other embodiments, another signal is transmitted, such as via radio interface 52, including an indication indicating one of opting out of receiving the physical distancing information and opting in to receive the physical distancing information.

In an embodiment, at least one of the WD 22 and the at least network node 16 is part of a communication system 10. The communication system 10 is configurable at least in part to provide and/or act as a location service process including a plurality of levels. A lowest level of the plurality of levels is a radio access network (RAN) configurable to provide communication associated with at least one of a location service request and a location service response to at least one client of the location service process Having described the general process flow of arrangements of the disclosure and having provided examples of hardware and software arrangements for implementing the processes and functions of the disclosure, the sections below provide details and examples of arrangements for physical distancing tracking and notification, which may be implemented by the network node 16 and/or one or more wireless devices 22. For ease of understanding, explanation is made with reference to WD 22a and its components. However, it is understood that the discussion herein with reference to WD 22a may apply to all WDs 22.

In one embodiment, each of deployment is illustrated with Multi-operators, namely Operator A, Operator B, and Operator C. Each operator may have one or more corresponding subscriber. The multi-operator trend is extremely beneficial because a network node 16 may have the visibility of all mobile users under the coverage of each mobile user. Previously the totaling of users had to be performed at a much higher network level, thereby producing privacy and business intelligence concerns. Through the unique identifiers such as International Mobile Subscriber Identity Software Version (IMSI-SV), RNTI and SPID, the network node 16 knows exactly how many users that the network node 16 is serving at any grid square.

The number of mobile users is a good indication of people count. In 2020, mobile penetration has been served and indicated to be over 95%, even higher is some countries. If the number of users exceeds a threshold, an alert may be triggered, such as indicating the number of people is more than or equal to the number of subscribers in an area. As such, physical distancing rules may have been violated.

Deployment with Beam Forming

Figure 9:
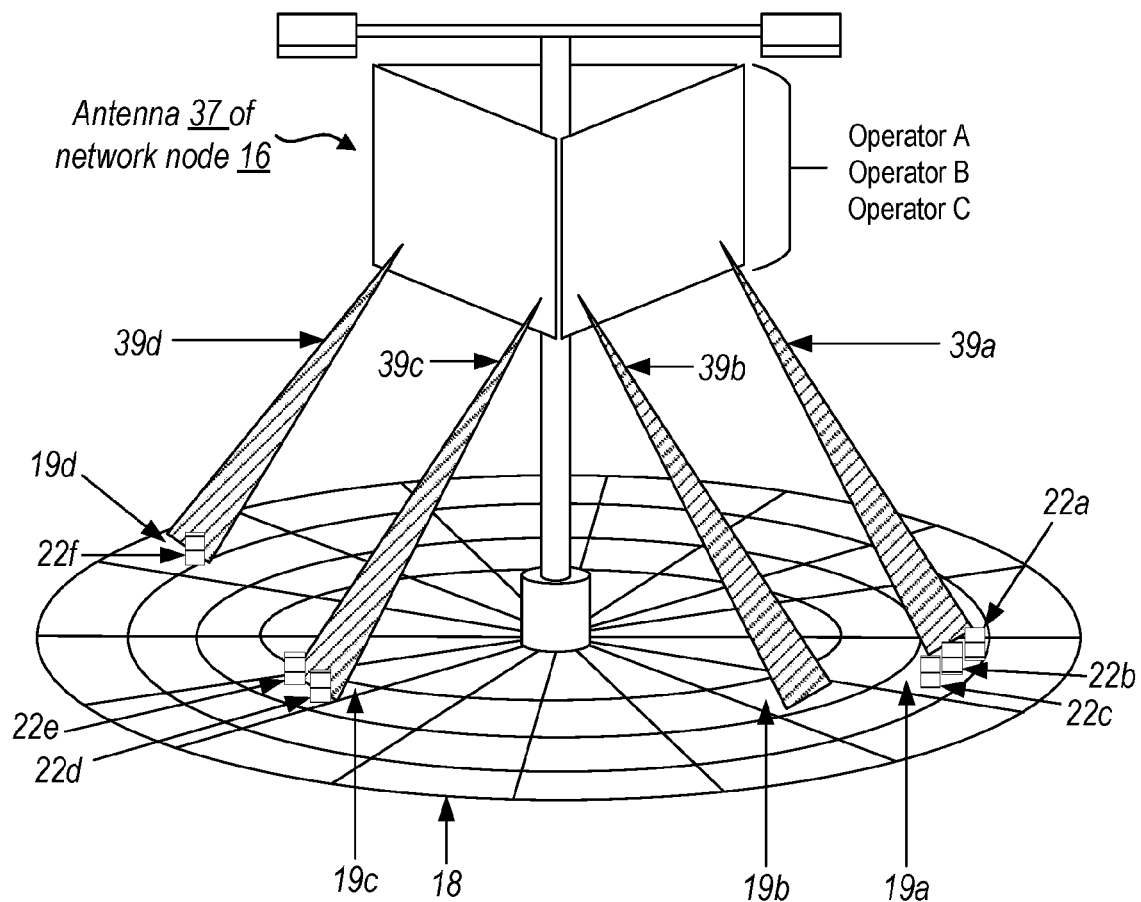
FIG. 9 is schematic diagram of an example deployment for detecting physical distancing violations via a small cell 5G beam according to one embodiment of the present disclosure.

NR relies on beam forming technology, which is much more mature than the one used in previous generations, to achieve high capacity. FIG. 9 illustrates a small cell lamppost deployment which may be equipment used to support a high density of WDs 22, i.e., exactly where physical distancing is needed. The deployment includes an antenna 37 of a network node 16. The antenna 37 may communicate with WDs 22 (e.g., WDs 22a, 22b, 22c, 22d, 22e, 22f), e.g., via communication link 39 (of wireless connection 38) which may include one or more communication links 39, e.g., communication links 39a, 39b, 39c, 39d. Although four communication links are shown any number of communication links may be used. Further, each communication link 39 may refer to a communication beam, such as a 5G beam of a MIMO antenna.

Antenna 37 of network node 16 servers a corresponding coverage area 18, which is divided in a plurality of portions 19, e.g., 19a, 19b, 19c, 19d, of coverage area 18. Further, a portion 19 of coverage area 18 may correspond to a set of radial coordinates, e.g., given by a sector and a band, of a grid. A WD 22 or more WDs 22 may be within the coverage area 18, e.g., a communication cell, more specifically, within a portion 19 of the coverage area 18. For example, WDs 22a, 22b, and 22c may be located within portion 19a of coverage area 18. Also in this example, portion 19b has no WDs 22 within portion 19b. Further, WDs 22d and 22e may be located within portion 19c of coverage area 18, and WD 22f may be located within portion 19d of coverage area 18. Portion 19a may correspond to radial coordinates (3,1), i.e., on the third band of a first sector of coverage area 18. Similarly, portion 19b corresponds to radial coordinates (2,2), portion 19c corresponds to radial coordinates (2, 7), and portion 19d corresponds to radial coordinates (4, 10). Although in this example coverage area 18 is divided in portions following radial coordinates, coverage area 18 may be divided in any other way and/or correspond to any other type of coordinates.

Further, antenna 37 of network node 16 may serve WDs 22 associated with different operators, e.g., Operators A, B, and C. In this nonlimiting example, WDs 22a, 22b, and 22d are associated with Operator B, WDs 22c and 22e are associated with Operator A, while WD 22f is associated with Operator C.

Network node 16 may determine that there is/are: (1) WDs 22a, 22b, and 22c within portion 19a; (2) no WDs 22 within portion 19b; (3) WDs 22d and 22e within portion 19c; and/or (4) WD 22f within portion 19d. In other words, the network node 16 may determine the location of each WD 22, and the number of persons within a portion 19 of the coverage area 18 and/or within the coverage area 18. More specifically, the network node 16 may determine that there is at least one person associated with each WD 22, e.g., a user of the WD 22, a subscriber associated with the WD 22 and the service provided by the corresponding operator.

Further, network node 16 may determine a physical distancing metric (PDM) based at least on a portion 19 of the coverage area 18 and/or a number of WDs 22. For example, network node 16 may determine that portion 19a, e.g., in location (3,1), of coverage area 18 has 3 WDs 22, i.e., 3 persons, may compare the number of WDs 22 to a predetermined threshold, determine that the number of WDs 22 exceeds the predetermined threshold and that the PDM has been exceeded, e.g., by assigning a "red" status the status of portion 19a. Network node 16 may further transmit a message to at least one WD 22 within portion 19a to alert a user of the WD 22 that the PDM has exceeded the predetermined threshold. Similarly, network node 16 may determine that a PDM for portions 19b and 19d has not been exceeded and/or assign a "green" status to portions 19b and 19d. Having determined that portion 19c has two WDs 22, network node 16 may determine that the corresponding PDM of portion 19c is about to be exceeded and assign a "yellow" status to portion 19c. The predetermined threshold may refer to an exposure threshold, e.g., indicating a threshold of an exposure to a chemical, a virus, a virus source such as a person/animal infected with the virus, and a radiation source such as a nuclear source.

Network node 16 can further divide coverage area 18 to create additional portions 19 (e.g., to further determine the PDM based on the newly added portions 19), and/or communicate using/assign one or more communication link 39, e.g., a 5G beam of a MIMO antenna, to each newly created portion 19. Creating additional portions 19 may allow the network node 16 to determine additional PDMs per area. For example, network node 16 may further divide portion 19a to determine whether the PDM between each one of the WDs 22 in portion 19a has been exceeded, e.g., the physical distancing between WD 22a and 22b is exceeded, while the physical distancing between WD 22b and WD 22c has not been exceeded. The network node 16 may then alert, e.g., via SMS message, some or all of the WDs 22 within portion 19a or within a newly created portion that the PDM has been exceeded or is about to be exceeded. A message may also be transmitted to WDs 22 to alert that at least a portion 19 have exceeded the PDM and/or about to exceed the PDM and/or not exceeded the PDM.

Although network node 16 may determine the PDM based on distance between WDs 22 and/or number of WDs 22 in an area, e.g., a portion 19, network node 16 may also determine the PDM based on other parameters, such as communication link 39 (e.g., per communication beam), antenna 37, coverage area 18, geographical area, vaccination parameters (e.g., vaccination status, vaccination status associated with communication service plan, viral load, behavior of vaccinated user), exposure levels (e.g., exposure to radioactive material and/or chemical), proximity (e.g., to persons, to other sources), contact duration, type of exposure (e.g., type of virus, type of radioactive material, type of chemical) and/or any other parameter. Further, network node 16 may adaptively reconfigure communication links 39, antennas 37, communication parameters, coverage areas 18, portions 19 of coverage area 18, and/or any other parameter based on historical data. Historical data may include previous determinations of PDM but is not limited to. For example, where the network node 16 has determined that WDs 22a and 22b exceed a PDM, and WD 22c has not exceeded the PDM (such as between WD 22c and any of WDs 22a and 22b), network node 16 may use the previously determined PDMs to adaptively reconfigure/resize the portions 19 of the coverage areas 18, e.g., by creating a new portion 19a to include WDs 22a and 22b and a new portion 19ab to include WD 22c. The network node 16 may make any other adaptive reconfiguration/resizing of the portions 19 and/or coverage area 18.

Although FIG. 9 illustrates a lamp-post, e.g. such as small cell in outdoor environment, having a concentric-ring, such as coverage area 18, the present disclosure is not limited to a lamp-post and/or a concentric ring and may also include and/or comprise an indoor environment, other outdoor environments such as a confined outdoor environment, a mid-range street environment, or any other environment. In other words, the processes described in the present disclosure are not limited to the environment shown in any of the figures, including not being limited to the environments shown in FIGS. 9 and 10.

Deployment with a Remote Radio Head Such as Distributed Network System (DNS)

Figure 10:
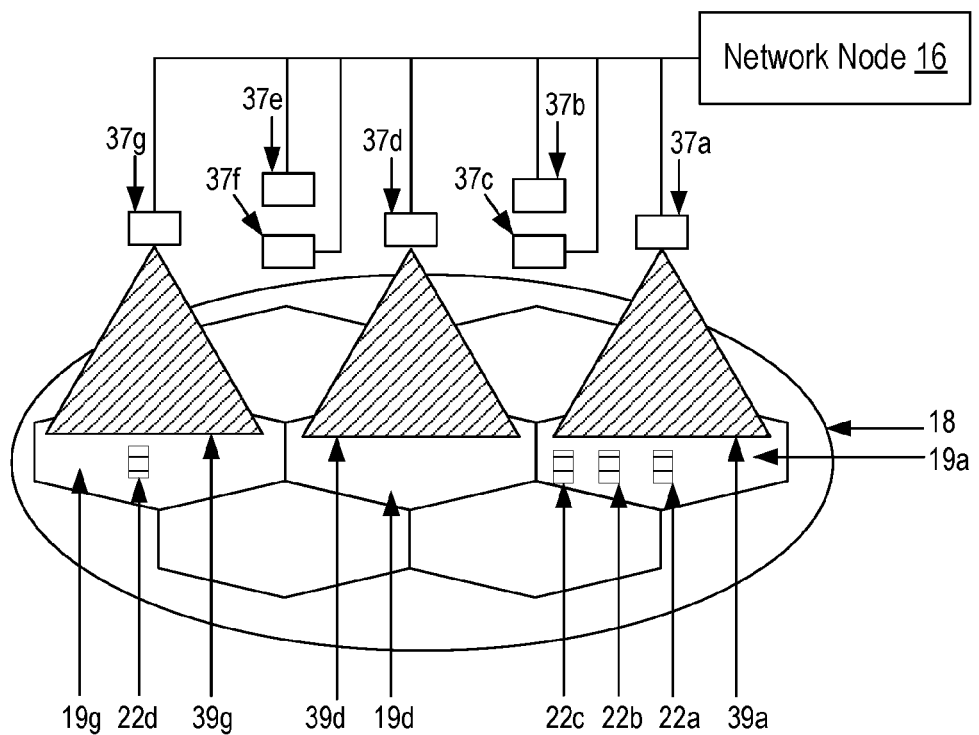
FIG. 10 is schematic diagram of an example deployment for detecting physical distancing violations via a small cell RDS Remote Radio Head system according to one embodiment of the present disclosure.

FIG. 10 illustrates a DNS deployment using multiple radio heads, e.g., RRHs. Each radio head is designated to cover a coverage area, which may be smaller than the coverage area shown in FIG. 9, so that by adding a portion of the coverage area corresponding to each RRH, an entire area, such as a building, achieves a predetermined network coverage and/or meets a predetermined capacity. The illustrated deployment allows boosting coverage and capacity in a densely populated indoor area, such as a train station or an airport.

Network node 16 may include a plurality of antennas 37, each antenna 37 of the plurality of antennas including a Remote Radio Head (RRH), to serve coverage area 18. Each antenna 37 serves a portion 19 of the coverage area 18, e.g., a small cell. In this nonlimiting example, antenna 37a serves a corresponding portion 19a of coverage area 18 and communicates with WDs 22a, 22b, and 22c via communication link 39a. Antenna 37d serves a corresponding portion 19d of coverage area 18 and communicates via communication link 39d. Antenna 37g serves a corresponding portion 19g of coverage area 18 and communicates with WD 22d via communication link 39g. Each one of antennas 37b, 37c, 37e, and 37f serves a corresponding portion of the coverage area 18. In some embodiments, each antenna 37 and each portion 19 correspond to a grid number, e.g., grid 1, grid 2, etc. Although network node 16 is shown as having a plurality of antennas 37, one or more antennas 37 (each may include an RRH) may correspond to a different network node 16 and/or serve more than one portion 19 of coverage area 18.

As described with respect to FIG. 9, network node 16 of FIG. 10 may also determine the PDM based on distance between WDs 22 and/or number of WDs 22 in any area, e.g., a portion 19 of coverage area 18. In addition, network node 16 may determine the PDM based on other parameters, such as communication link 39 (e.g., per communication beam), antenna 37, coverage area 18, geographical area, vaccination parameters (e.g., vaccination status, vaccination status associated with communication service plan, viral load, behavior of vaccinated user), exposure levels (e.g., exposure to radioactive material and/or chemical), proximity (e.g., to persons, to other sources), contact duration, type of exposure (e.g., type of virus, type of radioactive material, type of chemical), and/or any other parameter. Network node 16 of this non-limiting example may also adaptively determine the physical distance metric.

Partitioning coverage area 18 into a plurality of portions 19, e.g., a grid, may be performed for coverage division. However, the coverage area 18 may be used in another manner to calculate a number of persons, i.e., users of WDs 22 or persons associated with WDs 22 (e.g., to detect social distancing violations in an indoor environment). Calculating the number of persons may be used to trigger an alert when physical distancing is not observed and/or is determined to be less than a predetermined threshold. Absolute WD positioning techniques and relative WD positioning may be used to further refine determining PDMs.

5G networks such as DNS, e.g., Ericsson RDS, may provide WD positioning information with absolute accuracies (e.g., <3 meters) and higher absolute and relative accuracies (e.g., <<1 m). Relative accuracy may be used to determine a relative location of a WD 22 with respect to another WD 22. Relative positioning achieves the accuracy mentioned above by eliminating common error sources such as inaccuracies in antenna GPS coordinates and/or time inaccuracies, e.g., nanosecond inaccuracies, in reference timing. Accuracy of relative versus absolute positioning is a contributor to assessing "crowding" and "proximity" of users of WDs 22. For example, assessing "relative" positioning accuracy to sub-meter levels enables accurate contact tracing, which can be used to notify users, e.g., users of WDs 22, when recommended physical distancing (e.g., 2 meters, 6 feet) is violated.

In this nonlimiting example, each portion 19 of coverage area 18 may correspond to a specific grid, i.e., portions 19a-19g correspond to a first grid-seventh grid, respectively. Similarly, antennas 37a-37g correspond to the first grid-seventh grid, respectively. Accordingly, the first grid (corresponding to antenna 37a and portion 19a) has three WDs 22, e.g., 3 persons. Network node 16 determines a PDM for the first grid and/or determines that a predefined threshold has been exceeded and/or assigns a "red" status to the first grid. Network node 16 may transmit at least one alert, e.g., an SMS message, alerting the persons located in the first grid that the predefined threshold has been exceeded. Similarly, since the seventh grid, i.e., portion 19g, has one WD 22, e.g., one person, network node 16 determines that the predefined threshold may be about to be exceeded and/or assigns "yellow" status to the seventh grid. All other grids are assigned a "green" status as no WDs 22, e.g., no persons, are within these grids.

Figure 11:
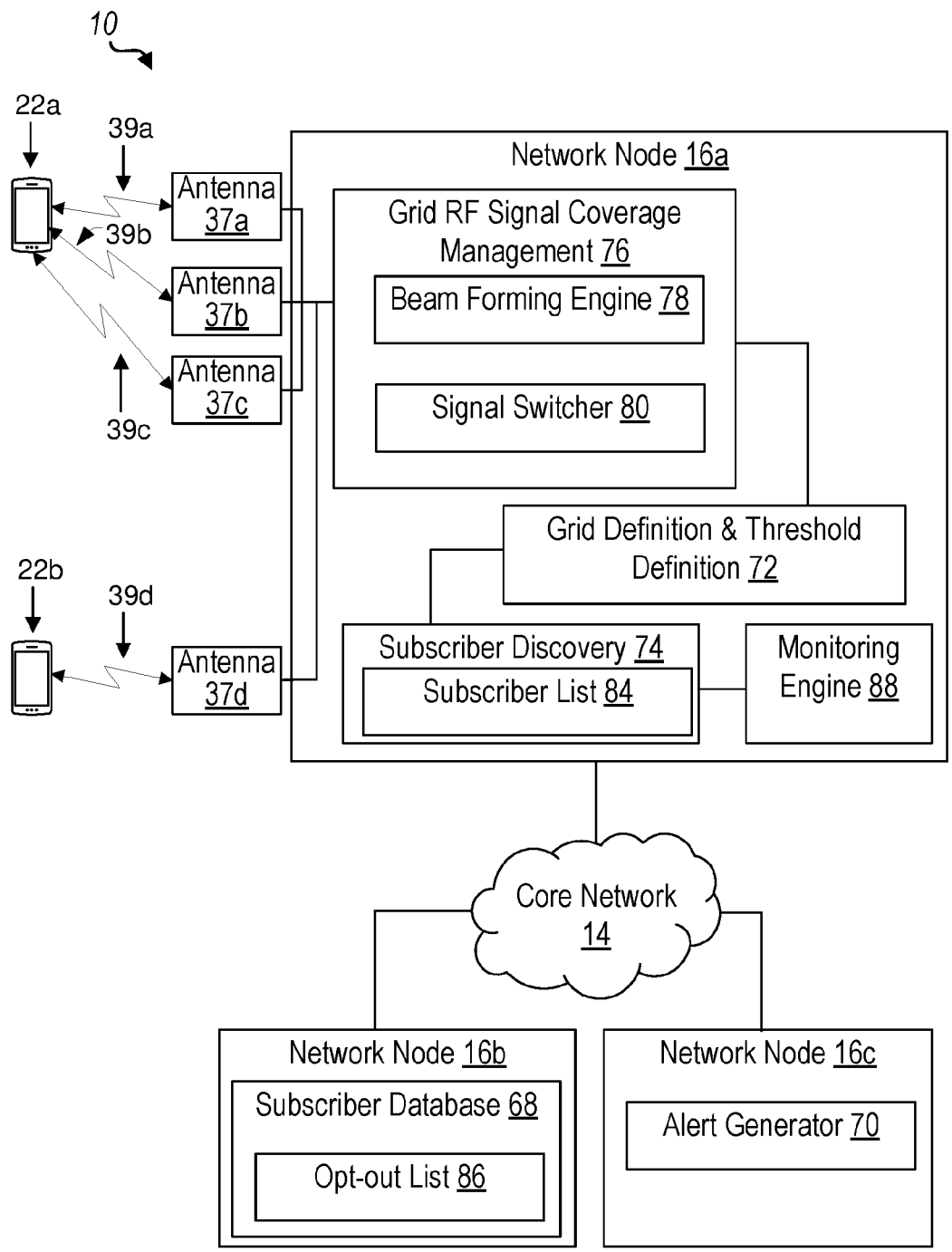
FIG. 11 is a block diagram of an example network node for detecting physical distancing violations according to one embodiment of the present disclosure.

FIG. 11 shows a block diagram of an example network node, e.g., network node 16a, configured to detect physical distancing violations and/or determine PDMs. In this non-limiting example, at least alert generator 70, grid definition and threshold definition 72, subscriber discovery 74, opt-out list 86, and/or monitoring engine 88 may be referred to as functional entities that perform at least some of the processes described in this disclosure. Each functional entity can be implemented logically and/or physically.

System 10 may include at least network node 16a, WD 22a, WD 22b, core network 14, network node 16b including subscriber database 68 and opt-out list 86, and network node 16c including alert generator 70. Network node 16a has a profile in grid definition and threshold definition 72 to define the area of each portion 19, e.g., grid, of coverage area 18 and a number of subscribers allowed in that portion 19, e.g., grid, which is used as a threshold in subscriber discovery 74. The area of portion 19, e.g., grid, and the threshold may be calculated by planning data and/or a consideration of the deployment geography/geometry. In this nonlimiting example, network node 16a may include one or more antennas 37 (e.g., 37a, 37b, 37c, 37d). Antennas 37a, 37b, and 37c may communicate via communication links 39a, 39b, 39c, respectively, e.g., RF beams such as 5G beams. Antenna 37d may be associated and/or include a Remote Radio Head (RRH) which may communicate via communication link 39d. Any antenna 37, e.g., an antenna of a small cell system, may be an RF panel in the case of beam forming, or a remote radio head in an RDS system. Put differently, in this nonlimiting example, WD 22a illustrates the case of beam forming approach and WD 22b illustrates the case of remote radio head approach.

Grid RF signal coverage management 76 controls one or more communication links 39, e.g., one or more RF beams, to cover an area of a grid specified in grid definition and threshold definition 72, which can be achieved in various manners, e.g., by forming an RF beam such as a 5G beam, by switching on/off a Remote Radio Head (RRH).

Beam forming engine 78 controls signals and a corresponding weight individually on each antenna 37 (e.g., 37a, 37b, 37c, 37d), e.g., so that an RF beam can direct a main lobe to a predefined area/region, e.g., a portion 19, defined in grid definition and threshold definition 72 under the coverage of the network node 16a. A duration of the beam is determined, e.g., so that the network node 16 has enough time to perform a subscriber count.

A signal switcher 80, e.g., a signal switcher in a Radio Frequency Front End (RFFE), controls the RF Front End of each RRH so that an on/off pattern can be attained. The pattern may at least be a round-robin and/or any other process.

Subscriber discovery 74 may determine how many subscribers are in a portion 19, e.g., grid, of a coverage area 18 and/or whether a physical distancing violation has occurred and/or a PDM. Subscriber discovery 74 may take existing data such as the number of RNTI, IMSI-SV or SPID as an input. In addition, subscriber discovery 74 may compare against a threshold of associated with the portion 19, e.g., grid, in grid definition and threshold definition 72, generate a subscribers list 84 and remove subscribers who have decided to opt-out, such as from opt-out list 86 found in subscriber database 68. Any repeated entry may be removed and communicated to the monitoring engine 88. At least an alert may be triggered by alert generator 70, where the alert may be transmitted to subscribers, e.g., to WDs 22.

The monitoring engine 88 determines if an anonymous (e.g., subscriber agnostic) process such as RNTI should be used, or a non-anonymous (e.g., subscriber specific) process such as derived identifier from IMSI should be used.

Core network 14 may refer to a 5G Next Generation Core (NGC) but is not limited to 5G NGC and may refer to any other technologies such as LTE Evolved Packet Core (EPC), e.g., in deployments such as Non-Stand Alone (NSA).

Subscriber database 68 of network node 16b may hold profiles, including profiles corresponding to each subscriber. In addition, or in the alternative, subscriber database 68 may include at least an opt-out list 86, which may be any one of a standalone aggregated list and an attribute belonging to each subscriber.

Alert generator 70 of network node 16c may receive a request from subscriber discovery 74 and trigger a transmission of a message, e.g., a pre-defined message, to the subscribers of concern about a social distancing violation alert and/or a PDM. The message may be an SMS message.

It is understood that, in some embodiments, subscriber database 68, alert generator 70, grid definition and threshold definition 72, subscriber discovery 74, grid RF signal coverage management 76, beam forming engine 78, signal switcher 80, subscriber list 84, opt-out list 86, and/or monitoring engine 88 shown in FIG. 11 can be implemented within any network node 16 as part of and/or in communication with any of the elements of the network node 16 (e.g., processing circuitry 42 and/or radio interface 36 and/or distancing determining unit 28) shown in FIG. 4.

Given that there is no additional/special 3GPP requirement or any special load, i.e., the principles of the present disclosure provide a WD-agnostic network process, WD compliance with 3GPP is adequate.

Figure 12A:
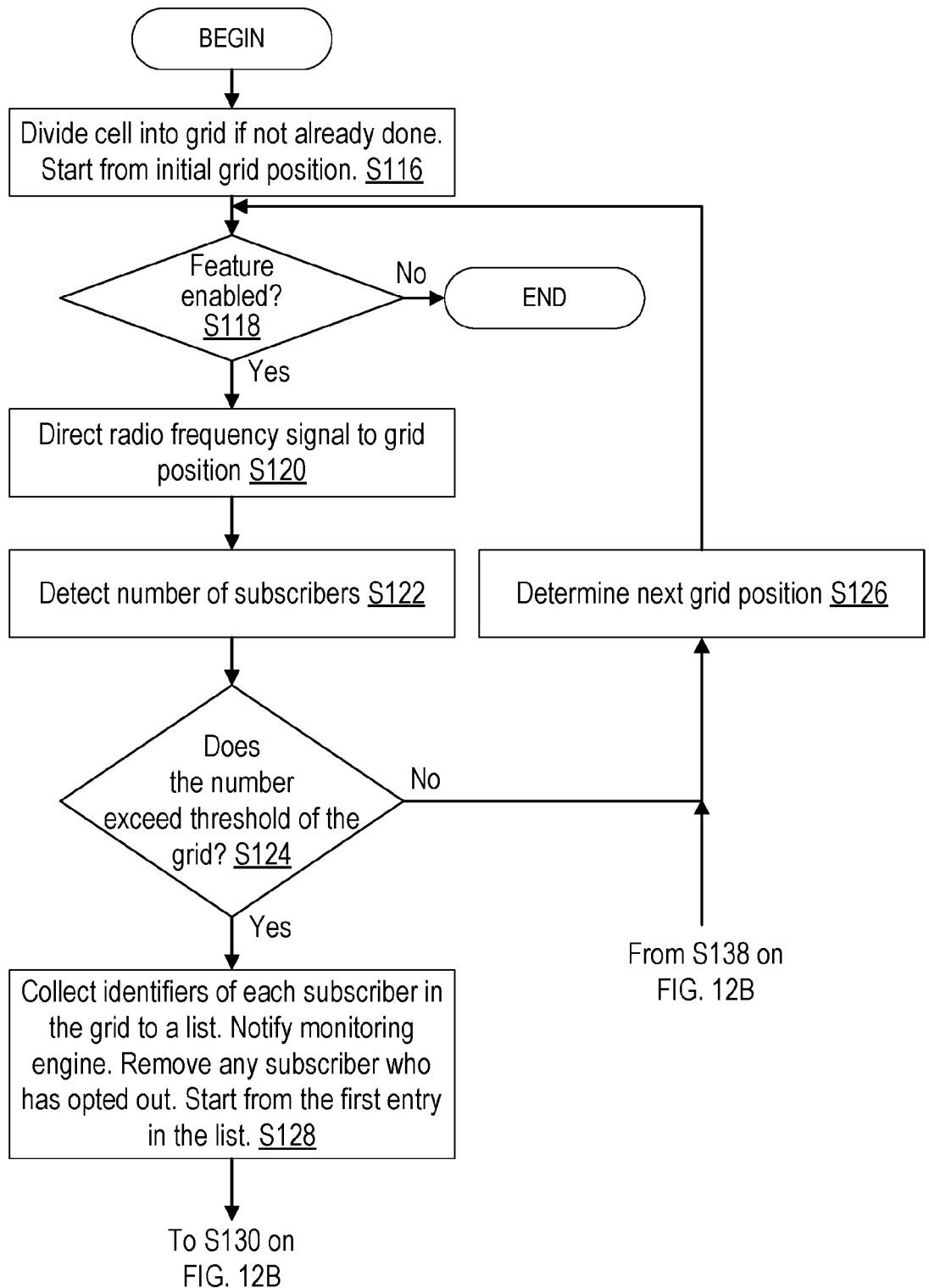
FIG. 12A is a flowchart of an example method for detecting physical distancing violations according to one embodiment of the present disclosure.
Figure 12B:
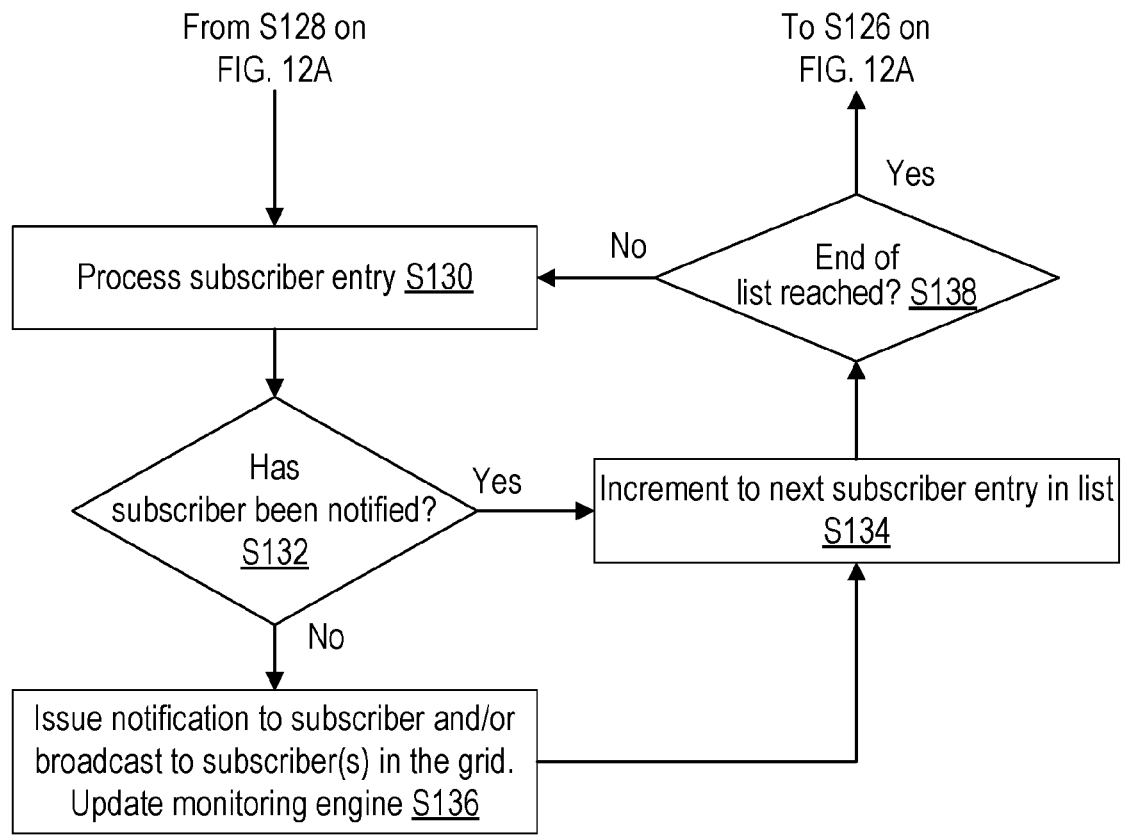
FIG. 12B is a continuation of the flowchart in FIG. 12A according to one embodiment of the present disclosure.

As shown in FIGS. 12A and 12B, an example process illustrates how a network node detects a number of subscribers in a grid and triggers alerts to subscribers. The order and/or flow illustrated in FIGS. 12A and 12B is for illustration purpose. The order, flow, and/or steps may be modified/interchanged.

The method starts at S116 where an initialization includes creating at least a grid, e.g., if this is the first time. The grid may refer to a partition of a coverage area 18 and may include a plurality of portions 19 of the coverage area 18. An operator may have an option to disable features associated with a subscriber, e.g., physical distancing determinations/alerts. At S118, if the operator disables the physical distancing feature, the process is terminated, e.g., the process exits. Otherwise, the process proceeds to the next step S120.

At S120, during a prescheduled detection time slot and/or based on a type of deployment, the network node 16 may direct an RF signal, e.g., a communication link 39 such as a 5G beam, to a first portion 19a, e.g., the first grid, of the coverage area 18. Additionally or alternatively, the network node 16 may turn on a communication link 39, e.g., a 5G beam, of a first radio head. At S122, using WD tracking data for mobility and hand-over, the network node 16 may count the number of subscribers (either active, inactive or idle) under the beam.

At S124, if a PDM, e.g., a number of subscribers, does not exceed a predefined threshold for the portion 19, the network node 16 may move on to another portion 19b, e.g., a next grid, via step S126. If the threshold is exceeded, the process proceeds to S128. At S128, the network node 16 creates a list of subscribers anonymously (e.g., subscriber agnostic) or non-anonymously (e.g., subscriber specific) and keeps the list and/or the contents of the list in monitoring engine 88. For non-anonymous, the network node 16 can prune the list if any user selects to opt-out of notifications, e.g., alerting services. However, the number of subscribers may be kept, e.g., to be used for detection.

At S130, the network node 16 may processes each subscriber in the list. Each subscriber may be identified with a tag, e.g., locally (RNTI) and/or globally (IMSI-SV and/or SPID).

At S132, the network node 16 may filter out a subscriber if the subscriber has been notified within a predefined amount of time. Filtering out a subscriber during the predefined amount of time may be used to avoid repeat alerts and/or spamming. If notified recently, e.g., within the predefined amount of time, the process is continued to S134 to process the next subscriber in the list. At S136, if the subscriber has not been notified, e.g., within the predefined amount of time, the network node 16 may transmit a message/alert, such as a notification via an SMS, e.g., by user specific (unicast) or by broadcast. In addition, the network node 16 updates monitoring engine 88 to include the notification event. At step S138, if the end of the list is not reached, the process proceeds to step S130. If the end of the list is reached, the process proceeds to step S126.

Alert Notification Mechanism

Transmission of alert messages, as described above, may include at least two types of alert messages, i.e., subscriber agnostic broadcast and subscriber specific message. However, any other type of alerts may be used.

Subscriber Agnostic Broadcast

The present disclosure introduces the concept of 5G beam forming broadcast. Digital beam forming allows multiple beams, e.g., communication links 39, to be generated by the network node 16 at the same time, where each beam may have different content. In massive multiple-input and multiple-output (MIMO), multiple antennas may focus energy into regions of space, which may be smaller than regions of space of prior radio access technologies, to bring improvements in throughput and radiated energy efficiency. Each network node 16 determines data transmitted from one antenna to that transmitted from another. Having data uniqueness in each beam, broadcast physical distancing alert in only to one beam may be performed, e.g., subscriber agnostic broadcast.

In some embodiments, alerts (e.g., alert notifications, broadcasts, messages) and latency associated with alerts may be generated/triggered in real-time (e.g., for emergency events such as a tsunami) and/or after a predetermined time interval has elapsed since the occurrence of an event (e.g., for events such as a contact tracing event) and/or before the occurrence of an event (e.g., for events such as a contact tracing event that is about to occur).

Figure 13:
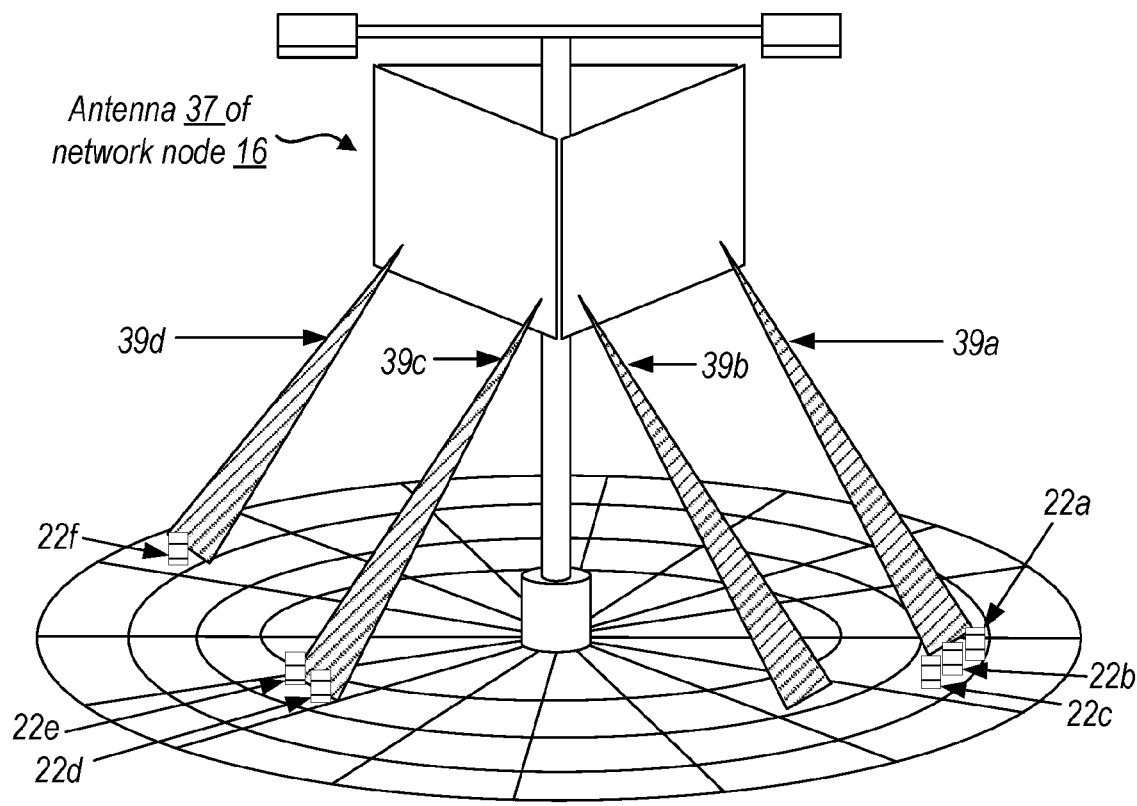
FIG. 13 is a schematic diagram of an example of digital beam forming broadcast according to one embodiment of the present disclosure.

FIG. 13 illustrates an example individual beam and beam unique content by digital beam forming. More specifically, A network node 16 via antenna 37 may communicate with several WDs 22, e.g., via wireless connection 38 which may include a plurality of communication links 39, e.g., 39a, 39b, 39c, 39d. In this nonlimiting example, communication links 39 refer to communication beams, e.g., 5G beams. Broadcasting may be performed per communication link 39. If an alert such as a broadcast alert is to be transmitted to any one of WDs 22a, 22b, and 22c, the broadcast alert may be transmitted while communication with any one of WDs 22a, 22b, and 22c is performed on communication link 39a, e.g., a first 5G beam. When no alert is to be transmitted to other WDs 22 such as WDs 22d, 22e, 22f, communication between the network node 16 (via antenna 37) and the other WDs 22 may be maintained using communication links 39c and 39d, e.g., a third 5G beam and a fourth 5G beam, even though no alert is being broadcast to the other WDs 22.

Subscriber Specific Message

Subscriber Specific Alert messaging makes use of Advanced Subscriber Group Handling (ASGH) Framework. An operator defines subscribers in an advanced subscriber group which allows/accepts physical distancing alerts. The identifier for such subscribers may be IMSI-SV, IMEI or SPID.

When an alert is required, the network node 16 checks the WD identifier in the beam area against a predefined Advanced Subscriber Group (ASG) which may be IMSI-SV, IMEI or SPID. When there is a match, the network node 16 proceeds to the next step and/or generates a physical distancing alert to a WD 22 associated with the subscriber/user.

Figure 14:
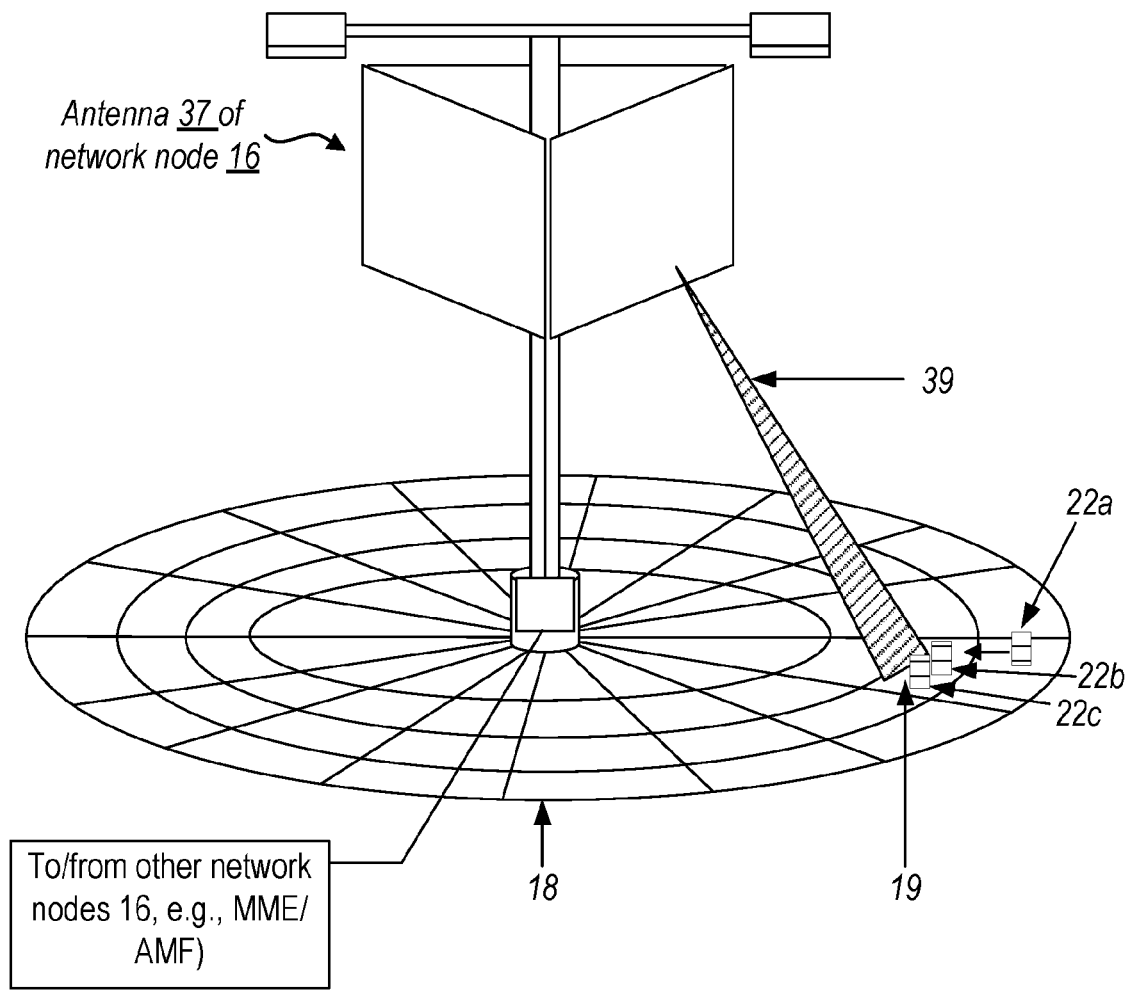
FIG. 14 is a schematic diagram of an example of advanced subscriber group handling alert according to one embodiment of the present disclosure.

FIG. 14 illustrates an example of advanced subscriber group handling alerting, e.g., using LTE MME and/or 5G AMF. WD 22a is detected by network node 16 via antenna 37 to be entering a portion 19 of a coverage area 18. Network node 16 may transmit a request to validate WD 22a against an Advanced Subscriber Group Handling (ASGH) Framework, which may be located in other network nodes 16, e.g., an MME, an AMF, and receive a response indicating that a subscriber associated with WD 22a has enabled alerts, e.g., physical distancing alerts. Then, network node 16 may transmit an alert to the WD 22a and/or WDs 22b and 22c indicating that a PDM has been exceeded or is about to be exceeded.

Figure 15:
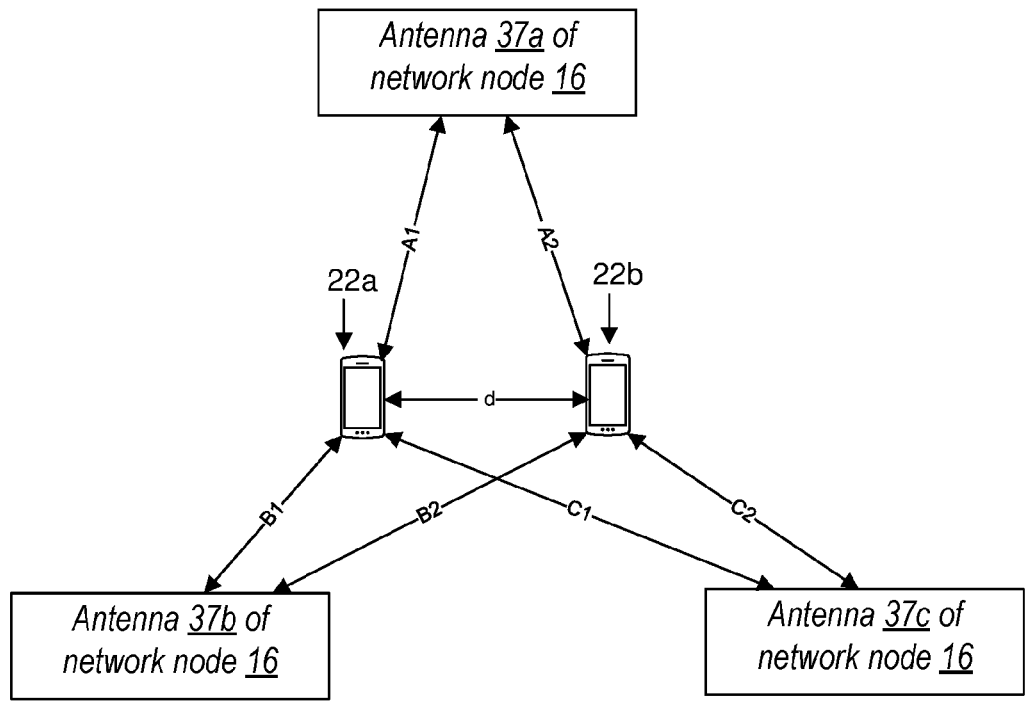
FIG. 15 is a schematic diagram of an example of tracking and contact tracing by time of arrival according to one embodiment of the present disclosure.

Advancing Physical Distancing and Contact Tracing by WD Positioning and Position History
WD Positioning by Time Difference of Arrival or Angle of Arrival FIG. 15 illustrates an example process of tracking and contact tracing using a time of arrival technique, e.g., a process of accuracy improvement using WD Positioning. Although the example process is described using Remote Radio Heads, such as in an RDS, any other type of communication element may be used.

Three antennas 37a, 37b, and 37c, each including a Remote Radio Head, and two WDs 22a and 22b, each associated with a different subscribers, are shown. The separation, referred to as "d", between the two subscribers may be determined by the following equation:

$$d=f(\Delta A, \Delta B, \Delta C, \text{Deployment Geometry}), \text{ where } \Delta A=g(A1,A2); \Delta B=g(B1,B2); \text{ and } \Delta C=g(C1,C2).$$

A1 may be a distance between antenna 37a and WD 22a. A2 may be a distance between antenna 37a and WD 22b. B1 may be a distance between antenna 37b and WD 22a. B2 may be a distance between antenna 37b and WD 22b. C1 may be a distance between antenna 37c and WD 22a. C2 may be a distance between antenna 37c and WD 22b. The terms distance and separation may be used interchangeably. A portion 19, e.g., a grid, of the coverage area 18 where WDs 22a and 22b are located may be determined. If the separation "d" is smaller than the threshold corresponding to the portion 19, an alert may be issued and/or transmitted to the two WDs 22a and 22b, thereby alerting the corresponding subscribers that a PDM has exceeded a predetermined threshold. An example of alerting that may be transmitted is illustrated in FIGS. 12A and 12B.

f( ) denotes a process, e.g., a generic function, which may be implemented with various processes such as a determination of a received signal strength, a signal angle of arrival, and a time difference of signal arrival at the antennas 37, e.g., remote radio heads. For example, the function f( ) may employ time of arrival measurements to form concentric circles to establish a portion 19 (e.g., grid location), and/or time difference of arrival measurements for intersecting hyperbolic lines to establish the grid locations. Other processes may be used as well.

Cell Grid Slicing and Time Advance

A network node 16 may include "[WD] timing advance" to detail the distance of the WD from the antenna of the network node 16 so that RF signals received at the network node 16 are time-aligned. While LTE Time Advance (TA) is specified in units of Ts=1/30.72 MHz~=32.5 ns (10 m), NR TA has much greater resolution than LTE TA. In one embodiment, 3GPP Technical Specification (TS) 38.211, provides that Tc is the basic time unit for 5G NR system and is calculated as Tc=1/(480000*4096)=5.086 ns which translates to about 1.5 meter, with resolution more than adequate than the typically recommended separation physical distancing (e.g., 2 m).

Figure 16:
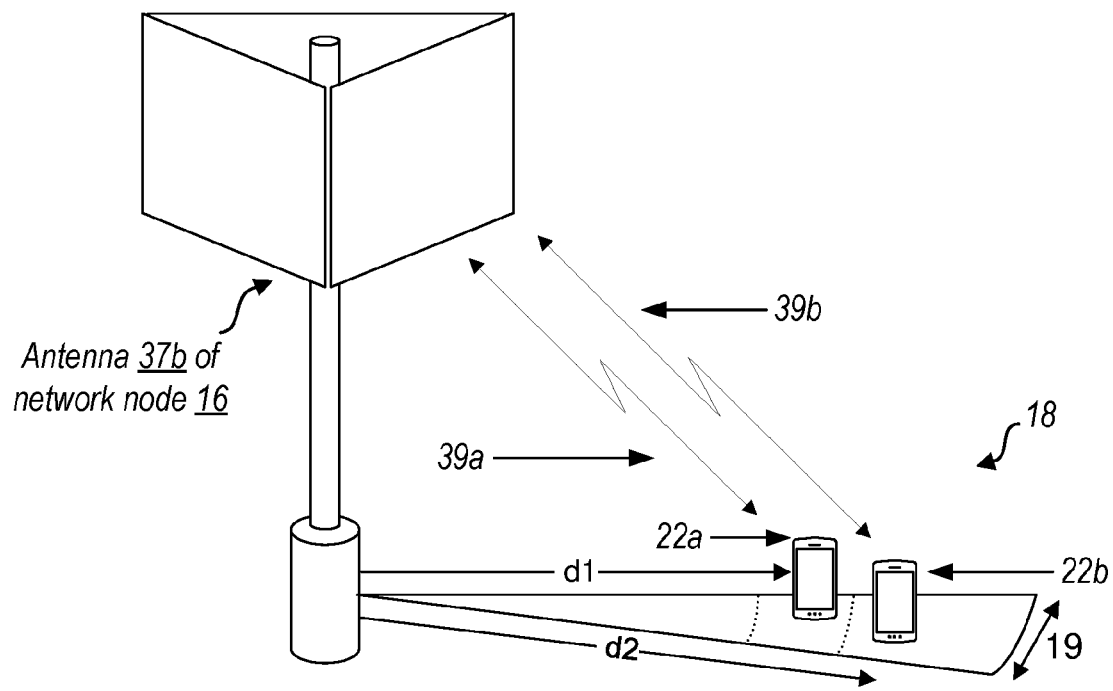
FIG. 16 is a schematic diagram of an example of tracking and contact tracing by cell grid slicing and time advance according to one embodiment of the present disclosure.

A coverage area 18, e.g., a small cell, may be divided into a portion 19 of the coverage area 18 such as a radial grid shown in FIG. 16. Using trigonometry and estimated distance, distances may be determined, e.g., using a radial θ corresponding to the location of a WD 22 with respect to the network node 16, and the distance between the WD 22 and the network node 16. For example, distances and radials (e.g., d1 and θ1; d2 and θ2) between the network node 16 and WDs 22a and 22b, it is possible to locate a coordinate of each one of WDs 22a and 22b. In other words, a combination of a TA setting associated with each of communication links 39a and 39b, e.g., NR beams, and the communication links 39a and 39b, e.g., the NR beams, provides a reliable indication of location of each WD 22, i.e., each subscriber. The indication of location may be used for detecting physical distance practice/behavior and/or contact tracing. A Subscriber Specific Messaging may be used, which relies on identifiers such as IMSI-SV, IMEI and SPID, to further provide identification information to the indication of location. The use of angle and distance illustrated in FIG. 16 may refer to polar/radial coordinates (angle, distance) used to represent the location of a WD 22, e.g., a subscriber. In this nonlimiting example, portion 19 of coverage area 18 may refer to a radial cell grid with predetermined angular width, e.g., expressed as Δθ at radial coordinate θ1. Other combinations of angles and distances may be used to determine portion 19 of coverage area 18.

Location History by WD Tracking Service

Typical 3GPP 4G/5G network design for location services assumes that WD tracking is managed in the core network after MME by the Serving Mobile Location Center (SMLC)/ Gateway Mobile Location Centre (GMLC).

Figure 17:
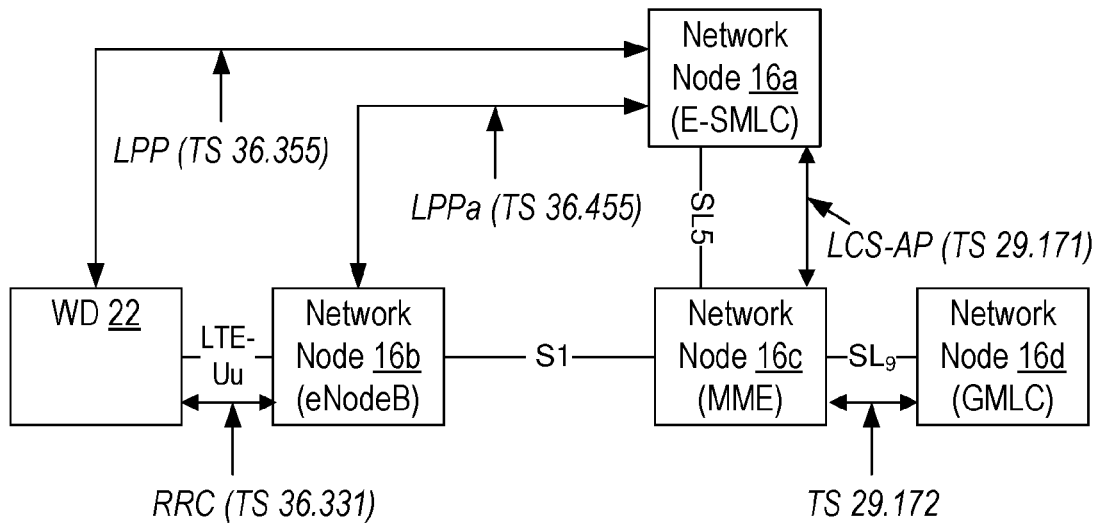
FIG. 17 is a block diagram of an example of contact tracing by WD tracking server according to one embodiment of the present disclosure.

An example of a typical 3GPP network design is shown in FIG. 17 including WD tracking data being managed by a tracking service. More specifically, FIG. 17 shows a block diagram of a contact tracing process by a WD tracking server.

A subscriber location in SMLC and GMLC was designed for emergency calls such as E-911 Emergency calls. Network node 16a, e.g., an Enhanced SMLC (E-SMLC) may communicate with WD 22 and/or use LTE Positioning Protocol (LPP), e.g., described in 3GPP TS 36.355. Network node 16a may also communicate with network node 16b, e.g., an eNodeB, and/or use LTE Positioning Protocol Annex (LPPa), e.g., as described in 3GPP TS 36.455. Further, network node 16a may communicate with network node 16c, e.g., an MME, and/or use Location Services Application Protocol (LCS-AP), e.g., as described in 3GPP TS 29.171. Network node 16b may also communicate with WD 22, e.g., via LTE-Uu, and/or use Radio Resource Control (RRC), e.g., as described in 3GPP TS 36.331. Network node 16b may communicate with network node 16, e.g., via S1. In addition, network node 16c may communicate with network node 16d, e.g., a GMLC, as described in 3GPP TS 29.172.

Information and report associated with subscriber location in SMLC and GMLC may be used by health care agencies to perform contact tracing, especially using identifiers such as IMSI-SV, IMEI and SPID. Risk metrics may be derived from subscriber location history information.

Record retention requirements may be used to cover incubation periods of a virus. For example, an infectious period (e.g., 14 days) may be covered by a record retention requirement that is the same or greater. Record retention requirements may be modified to adapt to other periods associated with other exposures and/or other possible outbreaks.

Determining how Much Viral Load to which a Person May have been Exposed
Infection Risk Metrics Quantified by Four C's While some of the typical wireless device applications may notify a person, who has been near someone with COVID-19, the typical wireless device is not aware of risk factors associated with the environment and surroundings. Therefore, a typical wireless device is incapable of incorporating risk factors, such as risk factors referred to herein as the "Four C's," which include Crowded; Close proximity; Closed confined indoor spaces; and the duration of Continuous exposures.

Utilizing a network-centric process, "static" deployment may be known and answers to the Four C's may be obtained.

Crowded: A monitoring engine 88 may calculate people density in a portion 19, e.g., cell grid, which may be used to record how "crowded" an incident is. The monitoring engine 88 may use any of the processes described in this disclosure for grid assignment and/or relative positioning data.

Close: Assessments of relative proximity (e.g., <<1 m) may be used in venues. Some venues may be uniquely designed to ensure a guideline separation (e.g., 2 m), such as a movie theatre, or conference room. Assessing relative proximity provides a fine degree of granularity to assess social distancing requirements even in crowded venues.

Confined Space: A wireless network/network node may be static and determine an exact location of each portion 19 of a coverage area 18, e.g., a cell grid. For example, an Ericsson RDS may be installed to provide network access in an indoor train station. In this example, the environment is known which may be used in the determination of PDMs. Also, establishments such as bars and churches have been associated with higher risk of aerosol droplet suspension, thereby being establishments that would benefit at least from PDMs determinations and notifications.

Continuous: WD Tracking Service logs in SMLC & GMLC may provide records of duration of continuous close-proximity, such as continuous close proximity that can lead to transmission/exposure/infection.

In other words, in addition to "physical proximity" detection, valuable information may be provided, including "continuous/duration of proximity" as well as other data such as "closed/confined" proximity, e.g., proximity detected by an indoor RDS deployment. The risk factor "Crowded" may affect risk of exposure as a statistical parameter. However, if an individual was exposed to more than one person, then the "crowed" factor may become a multiplier risk factor.

Viral Load Estimation by Examining Infection Risk Metrics

Data associated with risk metrics and the four C's may also be useful in estimating/determining an exposure level and/or exposure threshold. For example, an exposure level may include a viral load, i.e., an amount of virus exposure at the start of the virus infection. It is known that "higher SARS-CoV-2 viral loads" result in negative patient outcomes. Additionally, data suggests that viral load may be higher in patients with pre-existing conditions and/or affected by severe diseases. Typically, the higher the "infectious dose" or "viral load," the greater the severity of the illness. This relationship is well understood and common to many diseases.

This disclosure is not limited to "tracking and notification." Quantifying the amount of exposure may be determined, i.e., duration (1 . . . N), and perhaps a "closed space" multiplier factor. For example, a multiplier factor may be 1 for outdoor, 2 or 4 for indoor, as well as a crowded/contacts multiplier (# of contacts with infected people) and would provide not only a notification, e.g., "you've been near someone with COVID-19," but an additional risk factor, e.g., "you have been in continuous proximity with three people in an indoor door setting . . . " This information would serve to assess risk and potential viral loading, such as for healthcare professionals.

Risk=$f$(proximity to infected person;# of infected persons;exposure time;indoor or outdoor venue; infected person symptomatic or asymptomatic)

In short, while proximity may be a primary indication, additional extensions and features may be used to cover multiplicative risk factors that may be visible to network node 16, e.g., eNB/gNB, and/or allow network node 16 to assess overall infection risk and/or potential severity of illness.

As described above, in addition to the above risk factors, the degree of infection may be another factor to base a PDM determination. Asymptomatic persons may shed 50% less virus than symptomatic individuals. Therefore, the inclusion of a factor indicating degree of infection could potentially increase the risk factor in assessing contact tracing, e.g., by two-fold.

Other Applications

Crowdedness Alert Service: a subscriber relies on the network node 16 to monitor the surroundings and alert the user of areas to avoid. In other words, Crowdedness Alert Service may be used to alert a user ahead of time, even before going to a destination, e.g., a destination that has been found to have exceeded a PDM.

Health Service Hot-spot Detection: a regulatory agency may monitor physical distancing violations in real-time with/without manual monitoring or reporting, e.g., by a user. Health Service Hot-spot Detection allows dispatching of law enforcement as over-crowding occurs (i.e., for prevention).

Contact Tracing: a regulatory agency may use data to locate persons who may have be exposed and be able to ensure quarantine periods, e.g., 14-day quarantine or isolation, are observed.

Disinfectant Spot-cleaning: network node 16 may provide concise information of the places and exact locations where an infected person has been and/or dispatch disinfection and cleaning crews to wipe-down and/or disinfect all surfaces. Disinfectant Spot-cleaning permits an efficient use of crews and resources with a minimum disturbance to the public.

Figure 18:
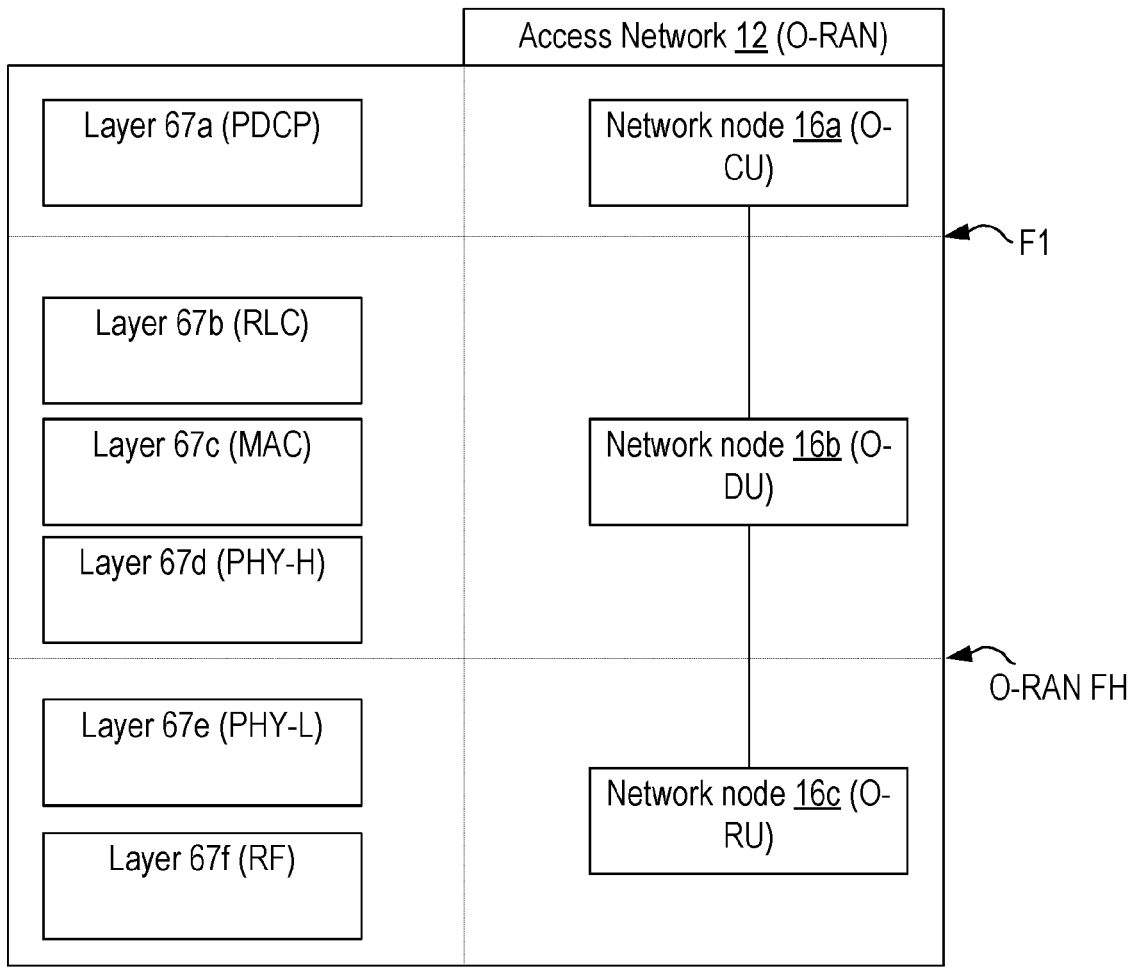
FIG. 18 is a block diagram of an example of a general structure of an of open radio access network cloud implementation according to one embodiment of the present disclosure.

FIG. 18 shows an overview of an example access network 12, e.g., an Open Radio Access Network (O-RAN) architecture, that communication system 10, e.g., a radio network system, may implement using cloud technology, shown as an embodiment of cloudification according to some of the principles of the present disclosure. Access network 12, e.g., the O-RAN, may include a plurality of network nodes 16 (16a, 16b, and/or 16c), where each network node 16 may communicate via one or more layers 67 (67a, 67b, 67c, 67d, 67e, and/or 67f). A layer 67 may also refer to a sublayer or any element of a communication layer. More specifically, Access network 12 may include network node 16a, e.g., an O-CU, supporting communication with network node 16b, e.g., an O-DU, supporting communication with network node 16c, an O-RU. Network node 16a may support and/or communicate and/or control via layer 67a, e.g., Packet Data Control Protocol (PDCP). Network node 16b may support and/or communicate and/or control via layer 67b, e.g., Radio Link Control (RLC), layer 67c, e.g., Medium Access Control (MAC), and/or layer 67d, e.g., Physical Layer-High (PHY-High). Network node 16c may support and/or communicate and/or control via layer 67e, e.g., Physical Layer-Low (PHY-Low), and/or layer 67f, e.g., Radio Frequency (RF). In this nonlimiting example, network nodes 16a and 16b may be part of the cloudification.

Figure 19:
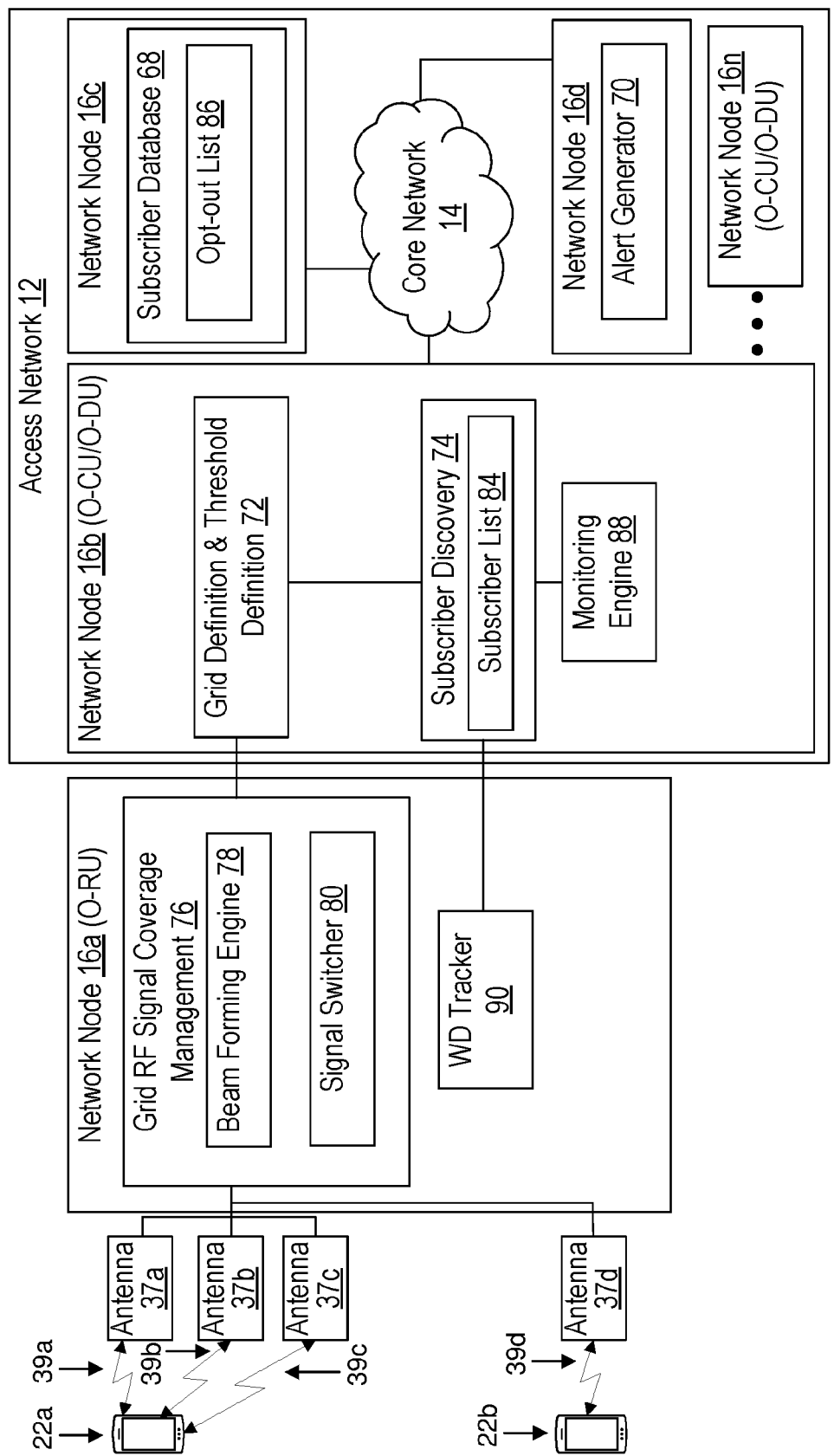
FIG. 19 is a block diagram of an example physical distancing system implementation by cloud.

As shown in FIG. 19, network node 16a, e.g., an O-RAN Radio Unit (O-RU), may perform Radio Frequency Front End handling. The functional blocks of FIG. 19 are similar to the blocks of FIG. 11. In addition to the functional blocks of FIG. 11, FIG. 19 further includes WD tracker 90 in network node 16a, e.g., the O-RU, that is used for real-time RF signal measurement enabling subscriber tracking and WD positioning.

It is understood that, in some embodiments, subscriber database 68, alert generator 70, grid definition and threshold definition 72, subscriber discovery 74, grid RF signal coverage management 76, beam forming engine 78, signal switcher 80, subscriber list 84, opt-out list 86, monitoring engine 88, and/or a WD tracker 90 shown in FIG. 19 can be implemented within any network node 16 as part of and/or in communication with any of the elements of the network node 16 (e.g., processing circuitry 42 and/or radio interface 36 and/or distancing determining unit 28) shown in FIG. 4.

One advantage of a cloud implementation is that a subscriber directory, among other things, may be shared across open distributed units (O-DU) since O-DUs may reside in the same cloud framework.

The following is a nonlimiting list of embodiments according to the principles of the present disclosure:

Some Example Embodiments

Embodiment A1. A network node configured to communicate with a plurality of wireless devices (WDs), the network node configured to determine a physical distancing metric, the network node comprising a radio interface and processing circuitry, the radio interface being in communication with the processing circuitry, the processing circuitry being configured to:
  determine a location of each WD of the plurality of WDs; and
  determine a physical distancing metric based at least on the location of each WD of a subset of WDs of the plurality of WDs, the location of each of WD of the subset of WDs being within a predefined area.

Embodiment A2. The network node of Embodiment A1, the processing circuit being further configured to:
  determine that the physical distancing metric in the area exceeds a predetermined threshold; and
  the radio interface being configured to:
    transmit a message to at least a WD of the plurality of WDs to alert a user of the WD that the physical distancing metric has exceeded the predetermined threshold.

Embodiment A3. The network node of Embodiment A1, the processing circuitry being configured to:
  estimate a viral load that a person has been exposed to, the person being associated with at least one WD of the plurality of WDs; and
  determine a WD location history for contact tracing.

Embodiment A4. The network node of Embodiment A1, wherein determining the physical distancing metric is at least by using one of:
  a deployment with beam forming;
  a deployment with remote radio head; and
  a deployment with multiple operators.

Embodiment B1. A method implemented in a network node configured to communicate with a plurality of wireless devices (WDs), the method comprising:
  determining a location of each WD of the plurality of WDs; and
  determining a physical distancing metric based at least on the location of each WD of a subset of WDs of the plurality of WDs, the location of each of WD of the subset of WDs being within a predefined area.

Embodiment B2. The method of Embodiment B1, the method further including:
  determining that the physical distancing metric in the area exceeds a predetermined threshold; and
  transmitting a message to at least a WD of the plurality of WDs to alert a user of the WD that the physical distancing metric has exceeded the predetermined threshold.

Embodiment B3. The method of Embodiment B1, the method further including:
  estimating a viral load that a person has been exposed to, the person being associated with at least one WD of the plurality of WDs; and
  determining a WD location history for contact tracing.

Embodiment B4. The method of Embodiment B1, wherein determining the physical distancing metric is at least by using one of:
  a deployment with beam forming;
  a deployment with remote radio head; and
  a deployment with multiple operators.

Embodiment C1. A wireless device (WD) configured to communicate with a network node, the WD comprising a radio interface and processing circuitry, the radio interface being in communication with the processing circuitry, the processing circuitry being configured to:
  transmit a wireless signal, the wireless signal including at least information associated with the WD to allow determination of a location of the WD; and
  receive optional physical distancing information based at least on the transmitted wireless signal and location information associated with WDs in proximity with the WD.

Embodiment C2. The WD of Embodiment C1, wherein the optional physical distancing information includes a physical distancing metric, the physical distancing information alerting a user of the WD that the physical distancing metric has exceeded a predetermined threshold.

Embodiment C3. The WD of Embodiment C1, the radio interface being further configured to:
  receive an estimate viral load that a person has been exposed to, the person being associated with the WD; and
  receive a WD location history for contact tracing.

Embodiment C4. The WD of Embodiment C1, wherein the radio interface is further configured to receive the optional physical distancing information at least via one of:
  a subscriber agnostic broadcast; and
  a subscriber specific message.

Embodiment D1. A method implemented in a wireless device (WD) configured to communicate with a network node, the method comprising:
  transmitting a wireless signal, the wireless signal including at least identity information associated with the WD to allow determination of a location of the WD; and
  receiving optional physical distancing information based at least on the transmitted wireless signal and location information associated with WDs in proximity with the WD.

Embodiment D2. The method of Embodiment D1, wherein the optional physical distancing information includes a physical distancing metric, the physical distancing information alerting a user of the WD that the physical distancing metric has exceeded a predetermined threshold.

Embodiment D3. The method of Embodiment D1, the method further including:
  receiving an estimate viral load that a person has been exposed to, the person being associated with the WD; and
  receiving a WD location history for contact tracing.

Embodiment D4. The WD of Embodiment D1, the method further including receiving the optional physical distancing information at least via one of:
   a subscriber agnostic broadcast; and
   a subscriber specific message.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node supporting communication with at least one wireless device, WD, of a plurality of WDs, the network node being configured to determine a physical distancing metric, PDM, associated with the at least one WD, the network node comprising processing circuitry configured to:
   determine a location of each WD of the plurality of WDs; and
   determine the PDM based at least in part on the location of each WD of a subset of WDs of the plurality of WDs and a predetermined threshold, the location of each of WD of the subset of WDs being within a predetermined area;
   determine an exposure level associated with a user associated with a corresponding at least one WD of the plurality of WDs, the exposure level including a viral load, the exposure level being determined at least based on one or both of:
      a people density associated with one or more location in a location history of the at least one WD; and
      the location history indicating presence of the at least one WD in a confined space; and
   transmit a message comprising information corresponding to the exposure level and the location history.

2. The network node of claim 1, wherein the processing circuitry is further configured to:
   determine the predetermined threshold, the predetermined threshold indicating a threshold of exposure to a predetermined source, the predetermined threshold corresponding to the predetermined area and being determined based on any one of:

a number of WDs located within the predetermined area;
a proximity at least between two WDs of the subset of WDs, the proximity being determined using one of a time of arrival determination and a distance-radial determination;
a time interval in which at least one WD of the subset of WDs has been located within the predetermined area; and
the predetermined source, the predetermined source being any one of a virus, a chemical, and nuclear source.

3. The network node of claim 1, wherein the processing circuitry is further configured to:
determine the PDM associated with the at least one WD one of has been violated and is about to be violated when the predetermined threshold has been exceeded and one of the at least one WD is within the predetermined area and about to enter the predetermined area.

4. The network node of claim 1, wherein the processing circuitry is further configured to:
determine an exposure level that a user has been exposed, the user being associated with at least one WD; and
determine a WD location history for exposure tracing.

5. The network node of claim 1, wherein the network node further comprises a radio interface being configured to:
transmit a first message including physical distancing information to the at least one WD of the plurality of WDs in part to alert a user of the WD that the PDM one of has been violated and is about to be violated; and
transmit a second message including exposure level information and WD location history information, any one of the first and second messages being transmitted via one of a subscriber agnostic broadcast and a subscriber specific message.

6. The network node of claim 1, wherein the processing circuitry is further configured to:
determine the predetermined area, the predetermined area being any one of a coverage area and a portion of a plurality of portions of the coverage area.

7. The network node of claim 1, wherein the processing circuitry is further configured to:
update the predetermined area based on any one of:
exposure level information associated with the at least one WD;
whether the PDM associated with the at least one WD one of has been violated and is about to be violated; and
whether the predetermined threshold has been exceeded.

8. The network node of claim 1, wherein determining the PDM is performed at least by using a deployment with one of:
a plurality of network nodes, each one of the plurality of network nodes being in communication with the network node and at least one WD and being used at least to determine the location of each WD based on triangulation;
beam forming;
a remote radio head; and
multiple operators.

9. The network node of claim 1, wherein the processing circuitry is further configured to:
collect at least one identifier of the at least one WD;
obtain a user profile corresponding to the at least one identifier, the user profile including user information associated with a user of the at least one WD, the user information including any one of:
a vaccination status of the user;
a vaccination status associated with a family plan that corresponds to the at least one WD;
a behavior of the user; and
the determining the PDM being further based on the user information included in the user profile.

10. The network node of claim 1, wherein the PDM includes an expiration parameter, the expiration parameter indicating a time in which the PDM expires.

11. The network node of claim 1, wherein at least one of the network node and the at least one WD is part of a communication system, the communication system being configurable at least in part to provide and act as a location service process including a plurality of levels, a lowest level of the plurality of levels being a radio access network (RAN) configurable to provide communication associated with at least one of a location service request and a location service response to at least one client of the location service process.

12. A method implemented in a network node supporting communication with at least one wireless device, WD, of a plurality of WDs, the network node being configured to determine a physical distancing metric, PDM, associated with the at least one WD, the method comprising:
determining a location of each WD of the plurality of WDs; and
determining the PDM based at least in part on the location of each WD of a subset of WDs of the plurality of WDs and a predetermined threshold, the location of each of WD of the subset of WDs being within a predetermined area;
determining an exposure level associated with a user associated with a corresponding at least one WD of the plurality of WDs, the exposure level including a viral load, the exposure level being determined at least based on one or both of:
a people density associated with one or more location in a location history of the at least one WD; and
the location history indicating presence of the at least one WD in a confined space; and
transmitting a message comprising information corresponding to the exposure level and the location history.

13. The method of claim 12, wherein the method further includes:
determining the predetermined threshold, the predetermined threshold indicating a threshold of exposure to a predetermined source, the predetermined threshold corresponding to the predetermined area and being determined based on any one of:
a number of WDs located within the predetermined area;
a proximity at least between two WDs of the subset of WDs, the proximity being determined using one of a time of arrival determination and a distance-radial determination;
a time interval in which at least one WD of the subset of WDs has been located within the predetermined area; and
the predetermined source, the predetermined source being any one of a virus, a chemical, and nuclear source.

14. The method of claim 12, wherein method further includes:
determining the PDM associated with the at least one WD one of has been violated and is about to be violated when the predetermined threshold has been exceeded and one of the at least one WD is within the predetermined area and about to enter the predetermined area.

15. The method of claim 12, wherein method further includes:
   determining an exposure level that a user has been exposed, the user being associated with at least one WD; and
   determining a WD location history for exposure tracing.

16. The method of claim 12, wherein method further includes:
   transmitting a first message including physical distancing information to the at least one WD of the plurality of WDs in part to alert a user of the WD that the PDM one of has been violated and is about to be violated; and
   transmitting a second message including exposure level information and WD location history information, any one of the first and second messages being transmitted via one of a subscriber agnostic broadcast and a subscriber specific message.

17. The method of claim 12, wherein method further includes:
   determining the predetermined area, the predetermined area being any one of a coverage area and a portion of a plurality of portions of the coverage area.

18. The method of claim 12, wherein the method further includes:
   updating the predetermined area based on any one of:
      exposure level information associated with the at least one WD;
      whether the PDM associated with the at least one WD one of has been violated and is about to be violated; and
      whether the predetermined threshold has been exceeded.

19. The method of claim 12, wherein determining the PDM is performed at least by using a deployment with one of:
   a plurality of network nodes, each one of the plurality of network nodes being in communication with the network node and at least one WD and being used at least to determine the location of each WD based on triangulation;
   beam forming;
   a remote radio head; and
   multiple operators.

* * * * *